(12) United States Patent
Morris et al.

(10) Patent No.: US 7,681,272 B2
(45) Date of Patent: *Mar. 23, 2010

(54) COUNTERBALANCE ASSEMBLY FOR A FOLD OUT RAMP

(75) Inventors: Donald Morris, Conifer, CO (US); David Johnson, Modesto, CA (US)

(73) Assignee: Lift-U, division of Hogan Mfg., Escalon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/114,647

(22) Filed: May 2, 2008

(65) Prior Publication Data

US 2008/0273956 A1 Nov. 6, 2008

Related U.S. Application Data

(60) Provisional application No. 60/916,238, filed on May 4, 2007, provisional application No. 60/944,413, filed on Jun. 15, 2007.

(51) Int. Cl.
*E01D 1/00* (2006.01)
(52) U.S. Cl. .......................... 14/71.3; 414/921; 74/89.2
(58) Field of Classification Search ................. 414/465, 414/522, 537, 541, 55, 546, 548, 921; 14/69.5, 14/71.1, 71.3; 74/89.2, 89.21, 89.22; 16/280, 16/308; 224/497; 297/DIG. 4
See application file for complete search history.

(56) References Cited

U.S. PATENT DOCUMENTS

| | | | |
|---|---|---|---|
| 2,154,107 A | 4/1939 | Nystrom | |
| 4,503,722 A | 3/1985 | Suzuki | |
| 4,550,623 A * | 11/1985 | Gysling | ...................... 74/89.2 |
| 4,657,233 A | 4/1987 | Vroom | |

(Continued)

FOREIGN PATENT DOCUMENTS

DE 4413444 A1 10/1995

(Continued)

OTHER PUBLICATIONS

"EZ-Access Hitchhiker™ Wheelchair Ramp," EZ-ACCESS, a division of Homecare Products, Inc., n.d., <http://www.homecareproducts.com/dealers/PDF_Brochures/HitchHiker.pdf> [retrieved Oct. 20, 2008], 1 page.

(Continued)

*Primary Examiner*—Gary S Hartmann
(74) *Attorney, Agent, or Firm*—Christensen O'Connor Johnson Kindness PLLC

(57) ABSTRACT

A counterbalance for a ramp assembly includes a chain assembly and a spring assembly. The spring assembly includes a spring and first and second spring fittings. The first spring fitting restrains a first end of the spring when the ramp portion is between a neutral position and the stowed position and moves the first end of the spring toward a second end of the spring when the ramp portion moves from the neutral position toward the deployed position. The second spring fitting is spaced from the first spring fitting and restrains the second end of the spring when the ramp portion is between the neutral position and the deployed position. The second spring fitting moves the second end of the spring toward the first end of the spring when the ramp portion moves from the neutral position toward the stowed position.

20 Claims, 24 Drawing Sheets

U.S. PATENT DOCUMENTS

| | | | |
|---|---|---|---|
| 5,052,521 A | 10/1991 | Wendt | |
| 5,085,555 A | 2/1992 | Vartanian | |
| 5,111,912 A | 5/1992 | Kempf | |
| 5,145,310 A | 9/1992 | Calzone | |
| 5,160,236 A * | 11/1992 | Redding et al. | 414/537 |
| 5,224,722 A | 7/1993 | Kempf | |
| 5,306,113 A | 4/1994 | Mann | |
| 5,316,432 A | 5/1994 | Smalley | |
| 5,338,264 A * | 8/1994 | Kempf | 474/168 |
| 5,342,105 A | 8/1994 | Miles | |
| 5,391,041 A | 2/1995 | Stanbury | |
| 5,449,267 A | 9/1995 | Ablabutyan | |
| 5,678,984 A | 10/1997 | Petersen | |
| 5,791,717 A | 8/1998 | Reich | |
| 5,871,329 A | 2/1999 | Tidrick | |
| 6,125,491 A | 10/2000 | Alexander | |
| 6,179,545 B1 | 1/2001 | Petersen, Jr. | |
| 6,196,609 B1 | 3/2001 | Bowers | |
| 6,536,064 B1 | 3/2003 | Swink | |
| 6,602,041 B2 | 8/2003 | Lewis | |
| 6,698,998 B2 | 3/2004 | Koretsky | |
| 6,715,177 B1 | 4/2004 | Lagergren-Julander | |
| 6,718,886 B2 | 4/2004 | Engle | |
| 6,843,635 B2 | 1/2005 | Cohn | |
| 6,860,702 B1 | 3/2005 | Banks | |
| 6,964,445 B1 | 11/2005 | Bellis, Jr. | |
| 6,988,289 B2 | 1/2006 | Pedersen | |
| 7,029,050 B1 | 4/2006 | Johnson | |
| 7,156,441 B2 | 1/2007 | Austin | |
| 7,264,433 B2 * | 9/2007 | Navarro | 414/537 |
| 7,353,558 B2 | 4/2008 | Alexander | |
| 7,533,432 B2 * | 5/2009 | Morris et al. | 14/71.3 |
| 7,533,433 B2 * | 5/2009 | Morris et al. | 14/71.3 |
| 7,533,434 B2 * | 5/2009 | Morris et al. | 14/71.3 |
| 2002/0159871 A1 | 10/2002 | Ungetheim | |
| 2003/0071434 A1 | 4/2003 | Budd | |
| 2004/0022613 A1 | 2/2004 | Kellogg | |
| 2004/0083562 A1 | 5/2004 | Leblanc | |
| 2004/0096304 A1 | 5/2004 | Lewis | |
| 2004/0136820 A1 | 7/2004 | Cohn | |
| 2008/0271266 A1 * | 11/2008 | Johnson | 14/71.1 |
| 2008/0271267 A1 * | 11/2008 | Morris et al. | 14/71.1 |
| 2008/0271268 A1 * | 11/2008 | Johnson | 14/71.1 |
| 2008/0271269 A1 * | 11/2008 | Morris et al. | 14/71.1 |
| 2009/0035111 A1 * | 2/2009 | Morris et al. | 414/537 |
| 2009/0035112 A1 * | 2/2009 | Morris et al. | 414/537 |
| 2009/0035113 A1 * | 2/2009 | Morris et al. | 414/537 |

FOREIGN PATENT DOCUMENTS

| | | |
|---|---|---|
| DE | 202004013630 U1 | 12/2004 |
| DE | 102004048761 A1 | 4/2006 |
| DE | 202006012113 U1 | 12/2006 |
| EP | 0875421 A1 | 11/1998 |
| EP | 0976376 B1 | 12/2001 |
| EP | 1447272 A2 | 8/2004 |
| EP | 1738733 B1 | 1/2007 |
| EP | 1844980 A2 | 10/2007 |
| GB | 585917 | 2/1947 |
| GB | 2116940 A | 10/1983 |
| GB | 2274092 A | 7/1994 |
| GB | 2301082 A | 11/1996 |
| GB | 2306152 A | 4/1997 |
| GB | 2369344 A | 5/2002 |
| JP | 2001239888 A | 9/2001 |
| JP | 2008230270 A | 10/2008 |
| WO | 01/47746 A1 | 7/2001 |
| WO | 2005/123450 A1 | 12/2005 |

OTHER PUBLICATIONS

"Lift-U® Fold-Out Plus (LU11)," Configuration Drawing, Hogan Mfg., Inc., n.d., <http://liftu.hoganmfg.com/resources/docs/products/lu-11/32inWide_X_12inRise_Rev A.pdf> [retrieved Oct. 20, 2008], 4 pages.

"Lift-U® Fold-Out Plus (LU11)," Product Brochure, Hogan Mfg., Inc., n.d., <http://liftu.hoganmfg.com/resources/docs/products/lu-11/LU11_Brochure_080924.pdf> [retrieved Oct. 20, 2008], 2 pages.

"Powerleaf," Deans Systems, n.d., <http://doorsystemsgroup.net/index.php?option=com_content&view=article&id=58&Itemid=84> [retrieved Oct. 20, 2008], 1 page.

"Products: Transit/Motorcoach," Ricon Corp. © 2007, <http://www.riconcorp.com/pdfs/ricon_ramps.pdf> [retrieved Oct. 20, 2008], 2 pages.

"RA400 Transit Ramp," The Braun Corporation, n.d., <http://www.braunmoblity.com/products/commlif/media/RA400.pdf> [retrieved Oct. 20, 2008], 2 pages.

\* cited by examiner

COUNTERBALANCE ASSEMBLY FOR A FOLD OUT RAMP

CROSS-REFERENCE(S) TO RELATED APPLICATION(S)

This application claims the benefit of U.S. Provisional Application No. 60/916,238, filed on May 4, 2007, and U.S. Provisional Application No. 60/944,413, filed on Jun. 15, 2007, the disclosures of which are expressly incorporated by reference.

TECHNICAL FIELD

The present disclosure relates generally to wheelchair lifts and, more particularly, to fold out ramps for vehicles.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is lower and more accessible by wheelchair-bound passengers. Longer ramps are, however, heavier and require more torque about the pivot axis to be reciprocated between deployed and stowed positions. To satisfy this torque requirement, such fold out ramps use large electric motors, pneumatic devices, or hydraulic actuators to deploy and stow the ramp. Many of such systems cannot be moved manually in the event of failure of the power source unless the drive mechanism is first disengaged. Some existing fold out ramps can be deployed or stowed manually, but they are difficult to operate because one must first overcome the resistance of the drive mechanism. Moreover, dirt and debris often enter an interior portion of the ramp, causing premature wear and failure. Further, fold out ramps require a depression (or pocket) in the vehicle's vestibule floor in which to store the retracted/stowed ramp. When the ramp is deployed, the aforementioned depression presents an obstacle for wheelchair passengers as they transition from the ramp to the vestibule, and on into the vehicle.

As noted above, many existing fold out ramps are equipped with hydraulic, electric, or pneumatic actuating devices. Such devices are obtrusive and make access to and from a vehicle difficult when the ramp is stowed. Moreover, many of such fold out ramps have no energy storage capabilities to aid the lifting of the ramp, which would preserve the life of the drive motor or even allow a smaller drive to be employed. Finally, operating systems for such fold out ramps must have large power sources to overcome the moment placed on the hinge by the necessarily long moment arm of the fold out ramp.

SUMMARY

A counterbalance for a ramp assembly is described, wherein the ramp assembly has a ramp portion coupled for reciprocating motion between a stowed position and a deployed position. The counterbalance includes a chain assembly and a spring assembly. The chain assembly has a chain portion coupled to the ramp portion so that the chain portion moves along a path in a first direction when the ramp portion moves toward the stowed position, and in a second direction when the ramp portion moves toward the deployed position. The chain assembly further includes a rod coupled to the chain portion.

The spring assembly includes a spring, a first spring fitting, and a second spring fitting. The first spring fitting restrains a first end of the spring when the ramp portion is between a neutral position and the stowed position. When the ramp portion moves from the neutral position toward the deployed position, the first spring fitting moves the first end of the spring toward a second end of the spring. The second spring fitting is spaced from the first spring fitting and restrains the second end of the spring when the ramp portion is between the neutral position and the deployed position. The second spring fitting moves the second end of the spring toward the first end of the spring when the ramp portion moves from the neutral position toward the stowed position.

A described drive assembly is suitable for reciprocating a movable ramp portion of a ramp assembly between a stowed position and a deployed position. The drive system includes a motor and a drive shaft coupled to the motor and the ramp portion of the fold out ramp. Rotation of the drive shaft in a first direction drives the ramp portion toward the stowed position, and rotation of the drive shaft in a second direction drives the ramp portion toward the deployed position.

The drive assembly further includes a chain assembly and a spring assembly. The chain assembly has a chain portion coupled to the ramp portion so that the chain portion moves along a path in a first direction when the ramp portion moves toward the stowed position, and in a second direction when the ramp portion moves toward the deployed position. The chain assembly further includes a rod coupled to the chain portion.

The spring assembly includes a spring, a first spring fitting, and a second spring fitting. The first spring fitting restrains a first end of the spring when the ramp portion is between a neutral position and the stowed position. When the ramp portion moves from the neutral position toward the deployed position, the first spring fitting moves the first end of the spring toward a second end of the spring. The second spring fitting is spaced from the first spring fitting. The second spring fitting restrains the second end of the spring when the ramp portion is between the neutral position and the deployed position, and moves the second end of the spring toward the first end of the spring when the ramp portion moves from the neutral position toward the stowed position.

A described ramp assembly includes a ramp portion coupled for reciprocating movement between a stowed position and a deployed position. The ramp assembly further includes a chain assembly having a chain portion and a rod. The chain portion is coupled to the ramp portion so that the chain portion moves along a path in a first direction when the ramp portion moves toward the stowed position, and in a second direction when the ramp portion moves toward the deployed position. The rod is coupled to the chain portion.

The ramp assembly further includes a spring assembly having a spring, a first spring fitting, and a second spring fitting. The first spring fitting restrains a first end of the spring when the ramp portion is between a neutral position and the stowed position. When the ramp portion moves from the neutral position toward the deployed position, the first spring fitting moves the first end of the spring toward a second end of the spring. The second spring fitting is spaced from the first spring fitting. The second spring fitting restrains the second end of the spring when the ramp portion is between the neutral position and the deployed position and moves the second end of the spring toward the first end of the spring when the ramp portion moves from the neutral position toward the stowed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. Exemplary embodiments of the present invention are directed to ramp assemblies, and more specifically, to wheelchair ramp assemblies. In particular, several embodiments of the present invention are directed to wheelchair ramp assemblies suitable for use in buses, vans, etc. Several embodiments of the present invention are directed to compact ramp assemblies for a vehicle that when stowed, occupy a small amount of space within the vehicle floor, yet deploy to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the invention, as claimed. Thus, it will be apparent to one skilled in the art that aspects of the present invention may be employed with other ramp assemblies used in stationary installations, such as residential buildings and the like.

The following detailed description may use illustrative terms such as vertical, horizontal, front, rear, inboard, outboard, proximal, distal, etc. However, these terms are descriptive in nature and should not be construed as limiting. Further, it will be appreciated that embodiments of the present invention may employ any combination of features described herein.

Fold Out Ramp Assembly

Figure 1:
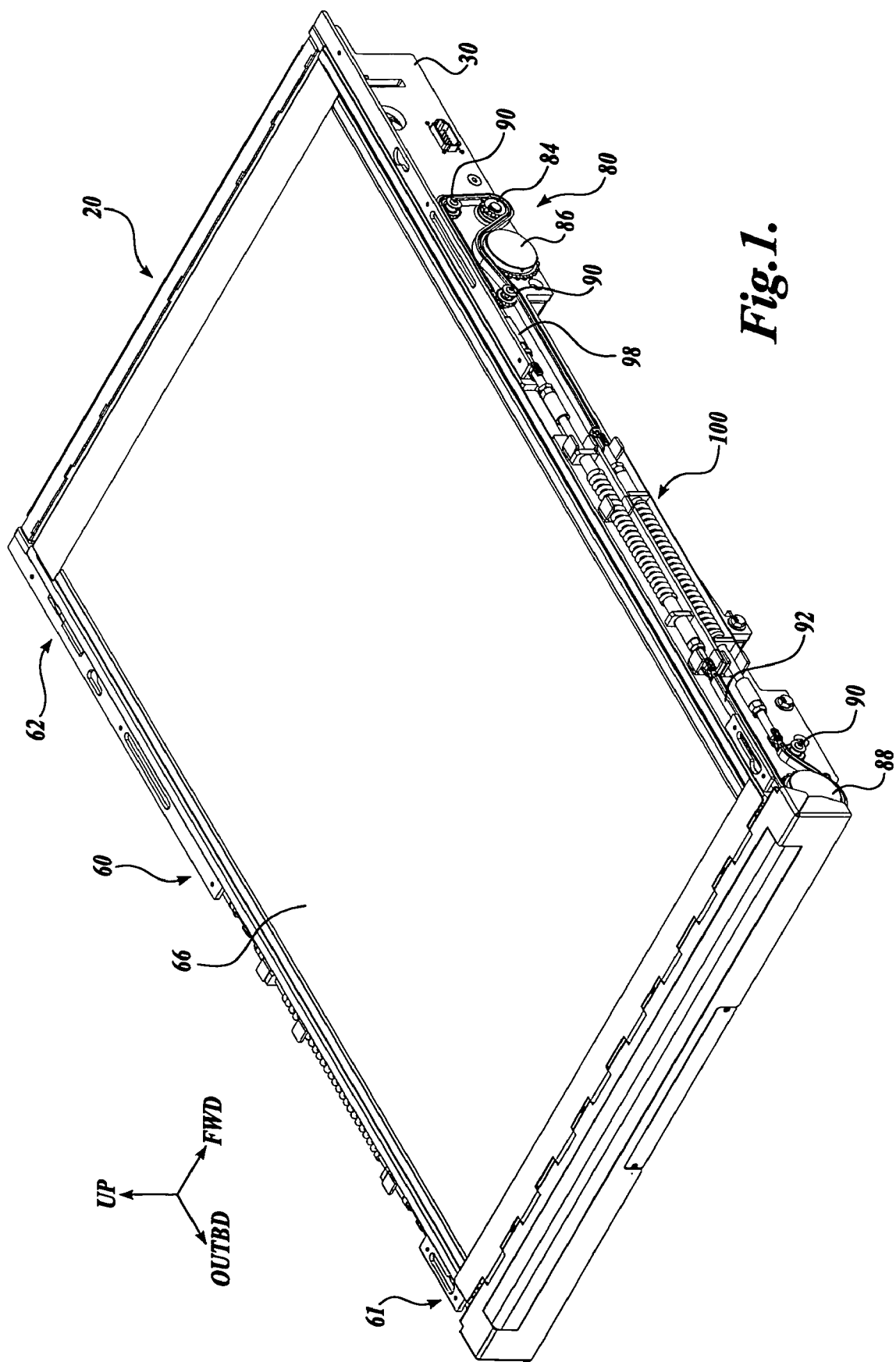
FIG. 1 is an isometric view of an exemplary embodiment of a ramp assembly, with an ramp portion in the stowed position.
Figure 2:
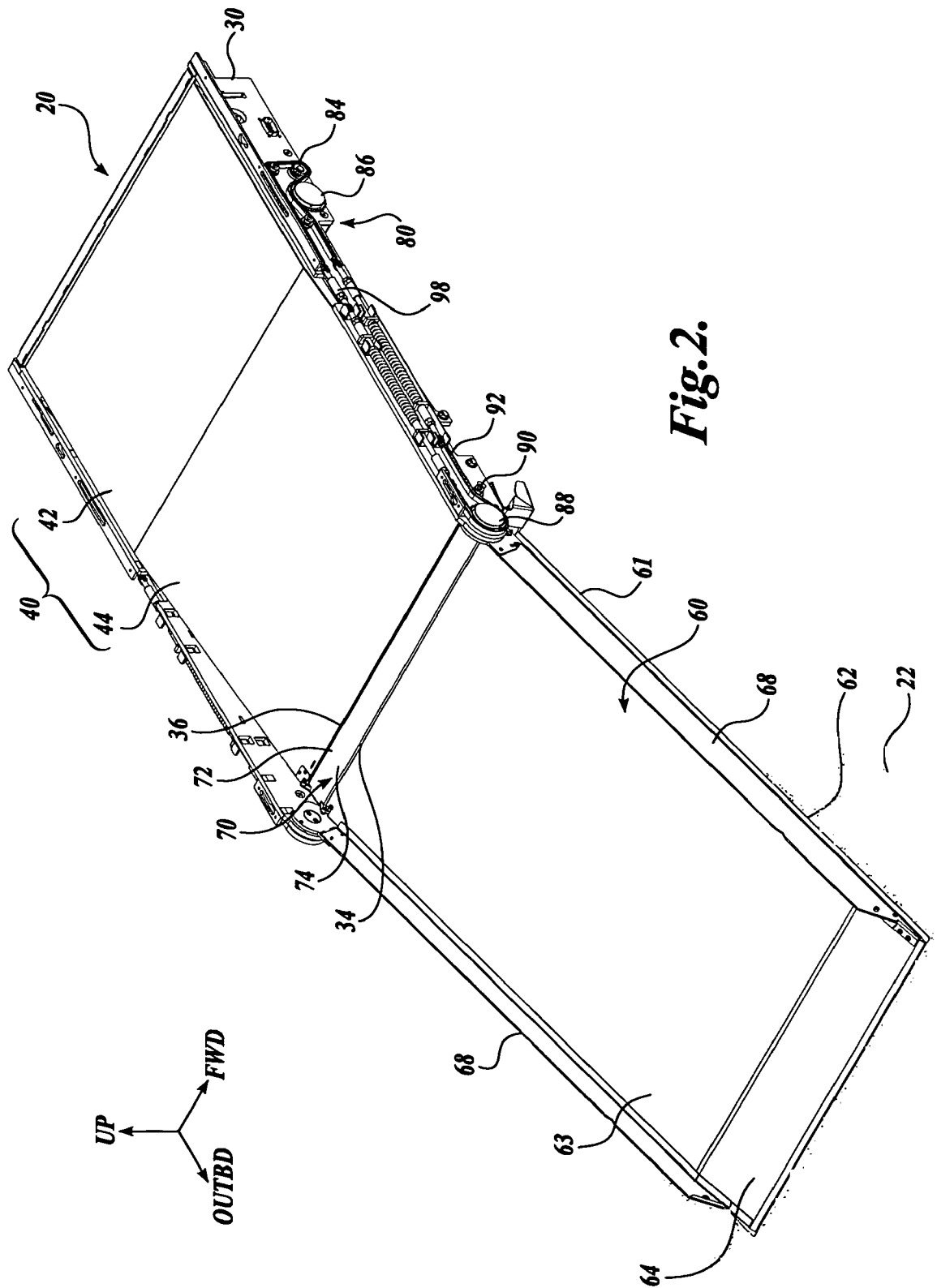
FIG. 2 is an isometric view of the ramp assembly shown in FIG. 1, with the ramp portion in a deployed position.

FIGS. 1 and 2 illustrate one embodiment of a fold out ramp assembly 20 (hereinafter "ramp assembly 20"). The ramp assembly 20 includes a frame 30, a drive assembly 80, an ramp portion 60, an intermediate panel assembly 70, a movable floor 40, and a counterbalance assembly 100. The frame 30 of the ramp assembly 20 is adapted to be mounted to a vehicle (not shown) having a floor, such as a bus or a van. The ramp assembly 20 is reciprocal between the stowed position, as shown in FIG. 1, and a deployed position, as shown in FIG. 2.

Although the illustrated embodiments of the ramp assembly 20 include a frame 30, other embodiments are contemplated in which the ramp assembly 20 does not include a frame 30. When such embodiments are installed in vehicles, the ramp assembly 20 components are attached directly to the structure of the vehicle or to a suitable structure within the vehicle, thus making a frame 30 unnecessary. Similarly, when such embodiments are installed in stationary installations, such as residential buildings and the like, the ramp assembly 20 components are attached to the structure of the building or any other suitable structure within the building. Accordingly, embodiments of the described ramp assembly 20 that do not include a frame, should be considered within the scope of the present disclosure.

Referring to FIGS. 1 and 2, the ramp portion 60 has a first end 61 and a second end 62. When the ramp portion 60 is in the stowed position, the first end 61 of the ramp portion 60 is outboard of the second end 62 of the ramp portion 60. As the ramp portion 60 moves from the stowed position to a deployed position, the ramp portion 60 rotates about the first end 61 of the ramp portion 60 until the second end 62 of the ramp portion 60 is outboard of the first end 61 of the ramp portion 60.

As best shown in FIG. 1, when the ramp assembly 20 is in the stowed position, the ramp portion 60 and the movable floor 40 are located such that the ramp portion 60 is positioned over the movable floor 40, and the lower surface 66 of the ramp portion 60 is substantially parallel with the floor (not shown) of the vehicle. In the deployed position, the ramp portion 60 extends in an outboard direction and contacts a surface 22, such as a curb or road side.

Referring now to FIG. 2, the ramp portion 60 is pivotally connected at the first end 61 to the frame 30. In addition, the first end 61 of the ramp portion 60 is hingedly coupled to the outboard end 74 of the intermediate panel assembly 70. The ramp portion 60 includes a panel 63, which is constructed from well-known materials. The ramp portion 60 further includes side curbs 68. The side curbs 68 extend upwardly from the forward and rear sides of the panel 63. Each side curb 68 enhances the structural strength of the ramp portion 60 and provides edge guards for the sides of the ramp portion 60, thereby increasing the safety of the ramp assembly 20. The second end 62 of the ramp portion 60 includes a tapered nose portion 64. The tapered nose portion 64 provides a smooth transition between the panel 63 and the curb or sidewalk when the ramp assembly 20 is in a deployed position.

Figure 6:
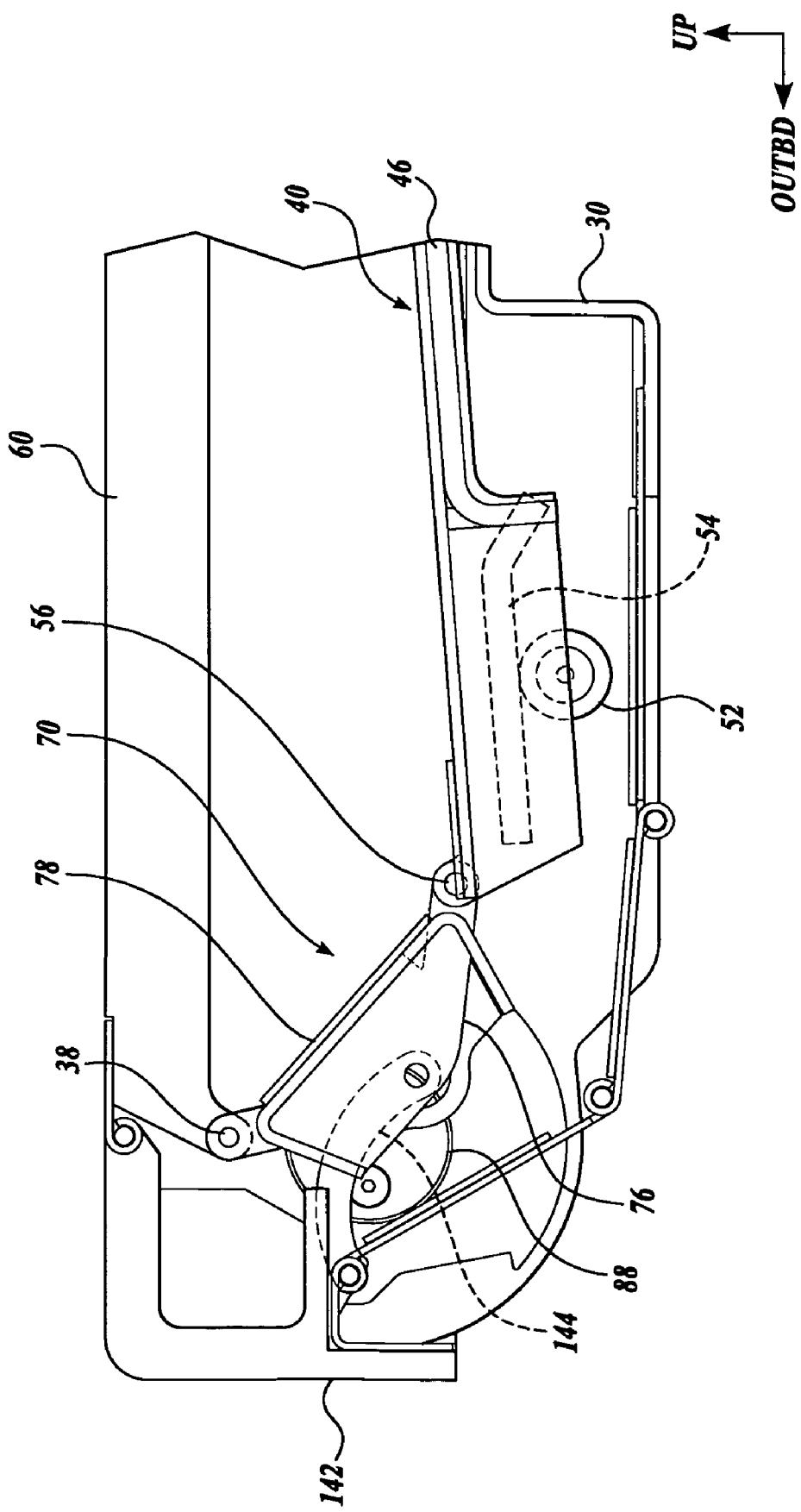
FIG. 6 is a partial cross-sectional side view of the outboard support of the movable floor of the ramp assembly shown in FIG. 4, with the ramp portion in the stowed position.
Figure 7:
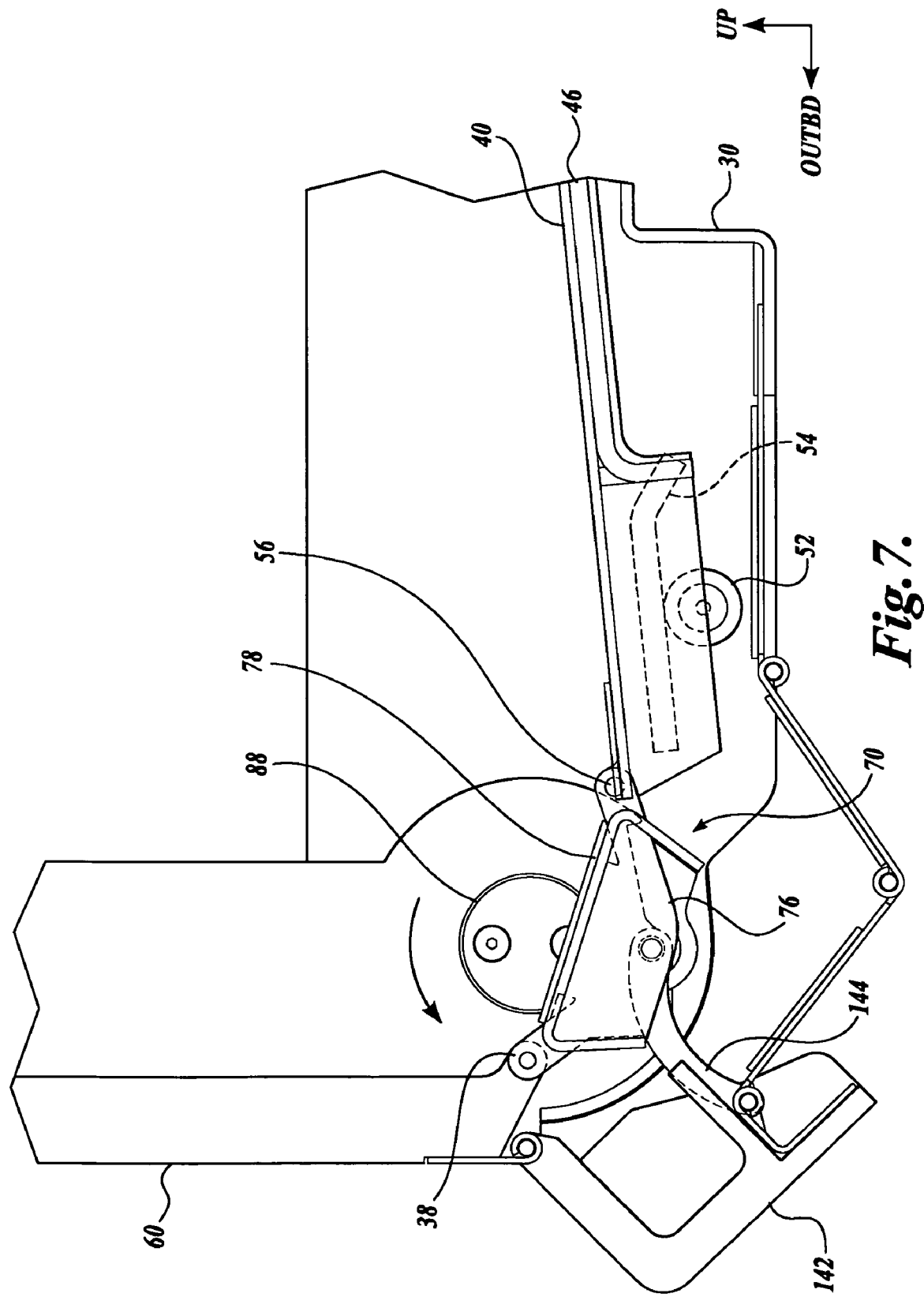
FIG. 7 is a partial cross-sectional side view of the outboard support of the movable floor of the ramp assembly shown in FIG. 4, with the ramp portion positioned between the stowed position and a deployed position.
Figure 8:
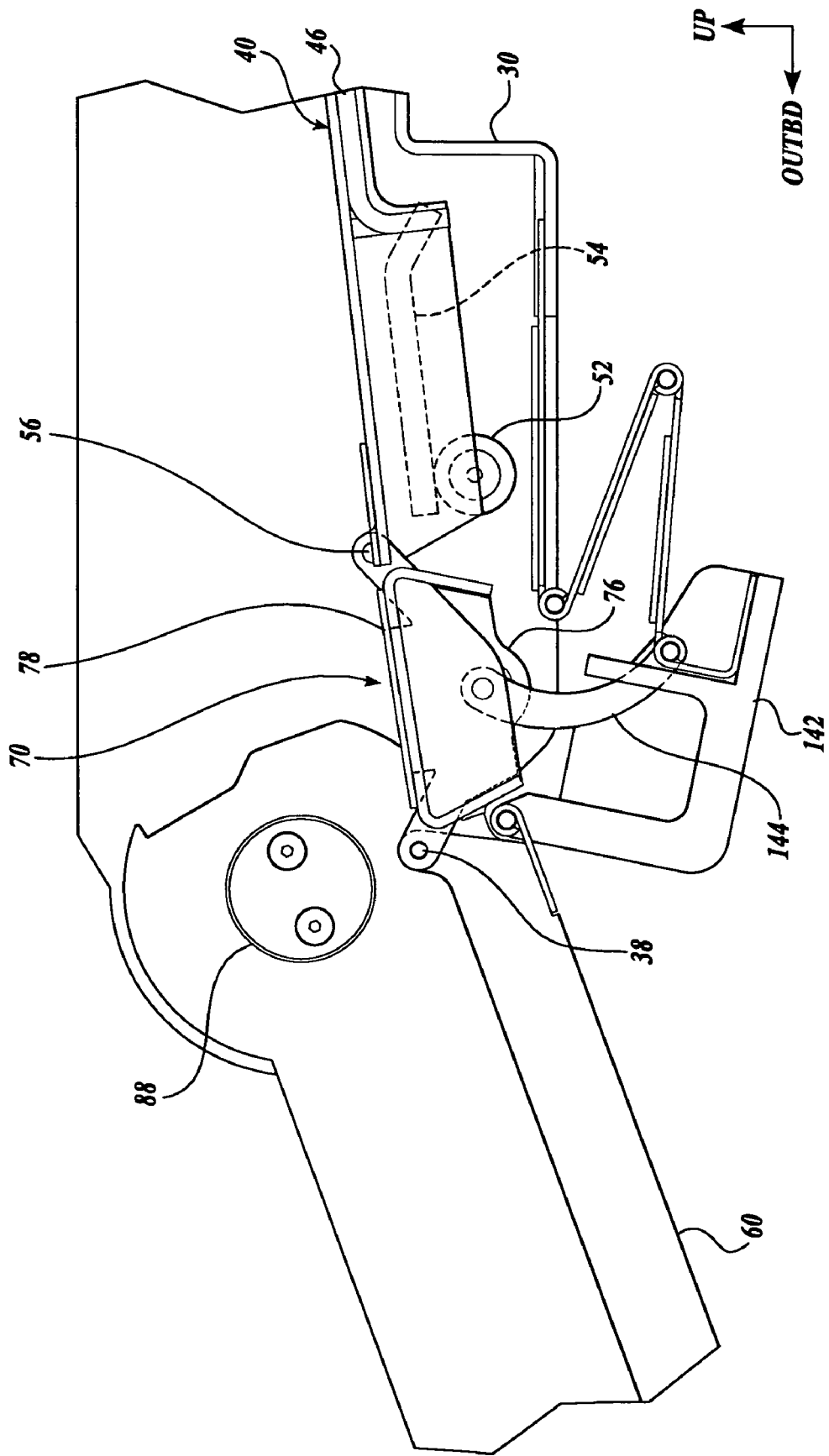
FIG. 8 is a partial cross-sectional side view of the outboard support of the movable floor of the ramp assembly shown in FIG. 4, with the ramp portion in a deployed position.
Figure 9:
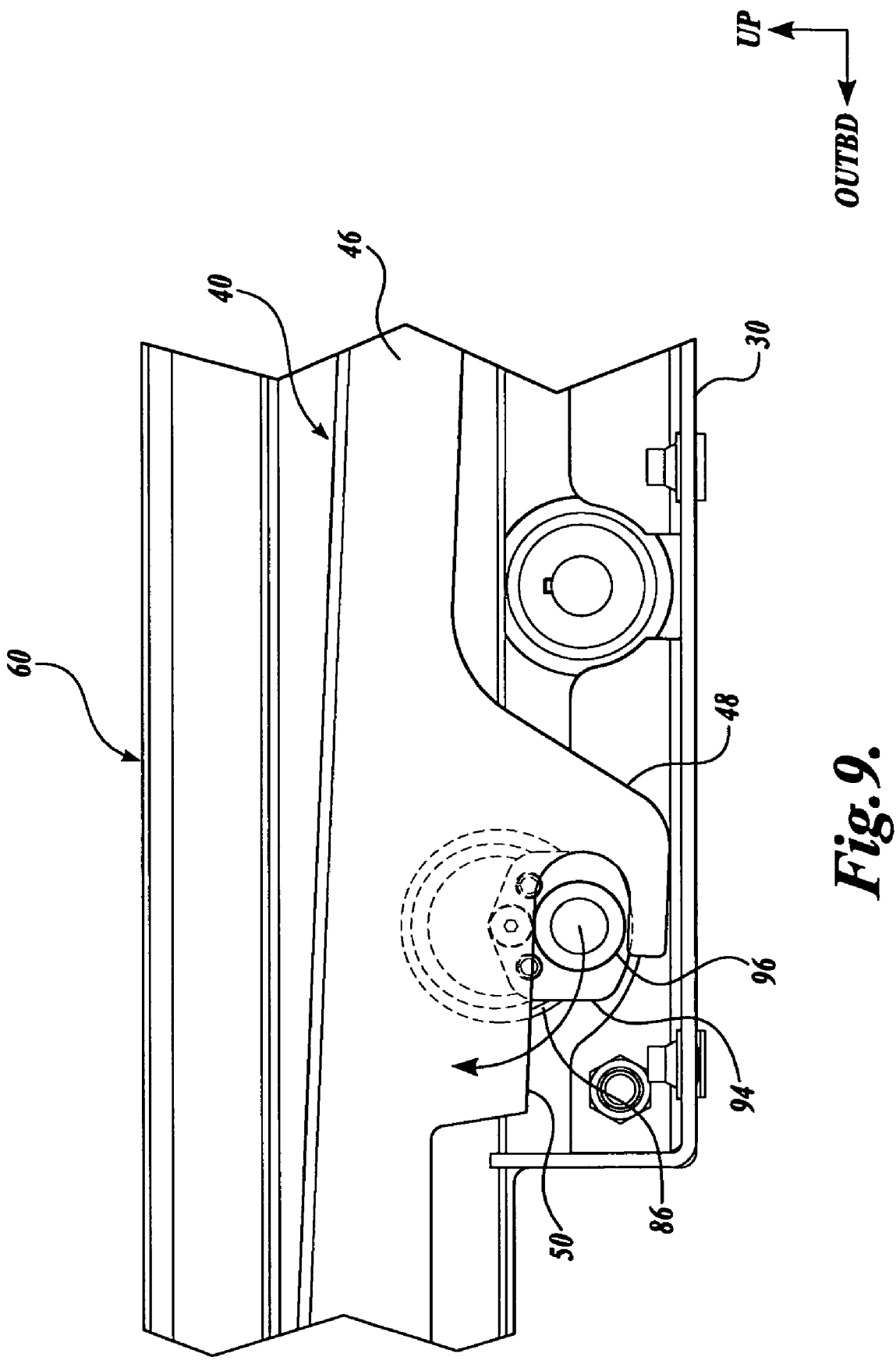
FIG. 9 is a partial cross-sectional side view of the inboard support of the movable floor of the ramp assembly shown in FIG. 5, with the ramp portion in the stowed position.

The movable floor 40 includes an inboard portion 42 fixedly located at an angle relative to a sloping outboard portion 44. When the ramp portion 60 is stowed, the movable floor 40 is disposed within the frame 30 and below the ramp portion 60 in a lowered position as best shown in FIGS. 6 and 9. Referring to FIGS. 6-11, as the ramp portion 60 is deployed, the outboard portion 44 of the movable floor 40 translates inboard and outboard in a substantially horizontal direction, while the inboard portion 42 travels upward in a substantially arcuate, clockwise path as viewed in FIGS. 9-11.

Figure 3:
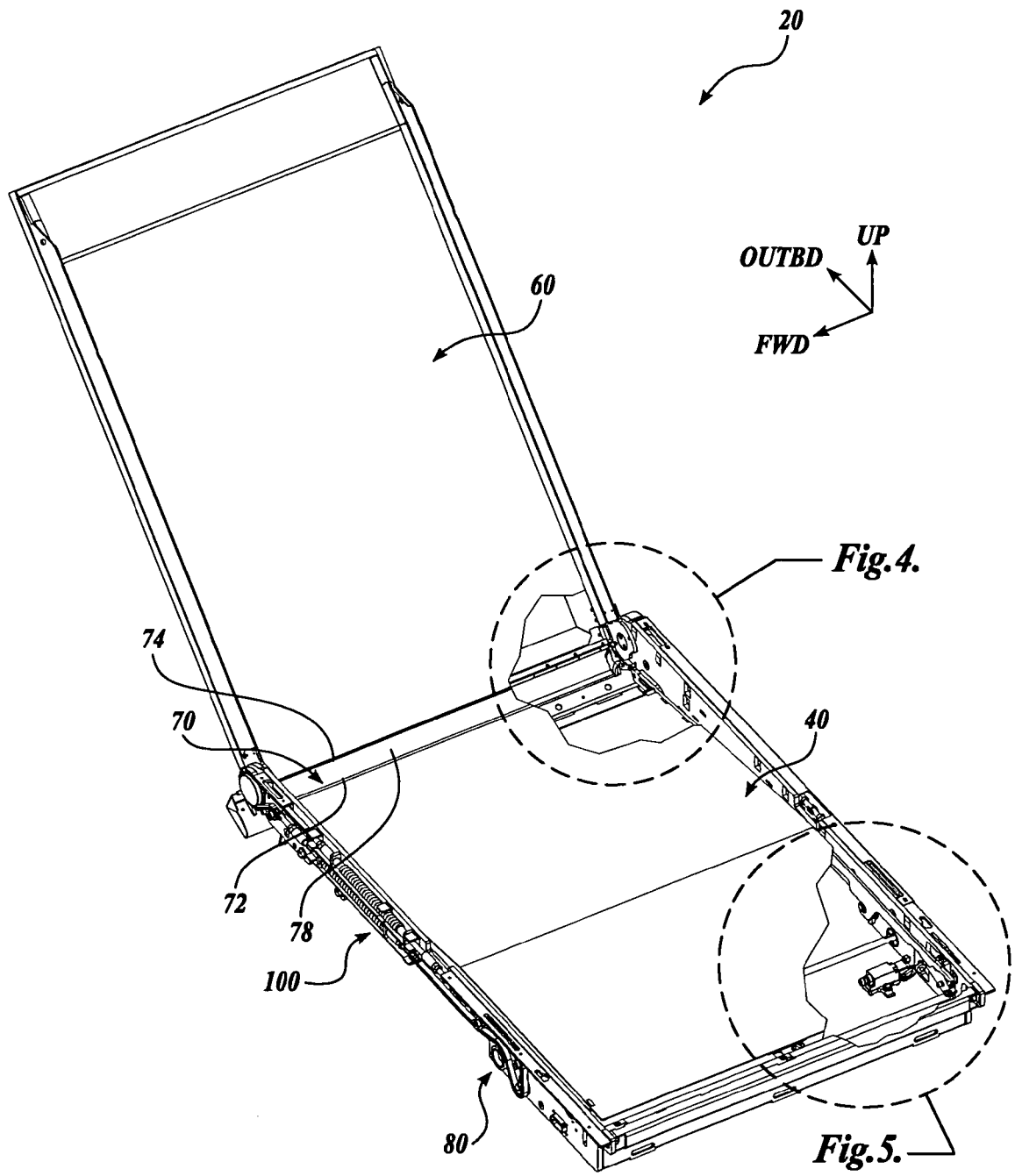
FIG. 3 is an isometric partial cutaway view of the ramp assembly shown in FIG. 1, with the ramp portion in a position between the stowed position and a deployed position.
Figure 4:
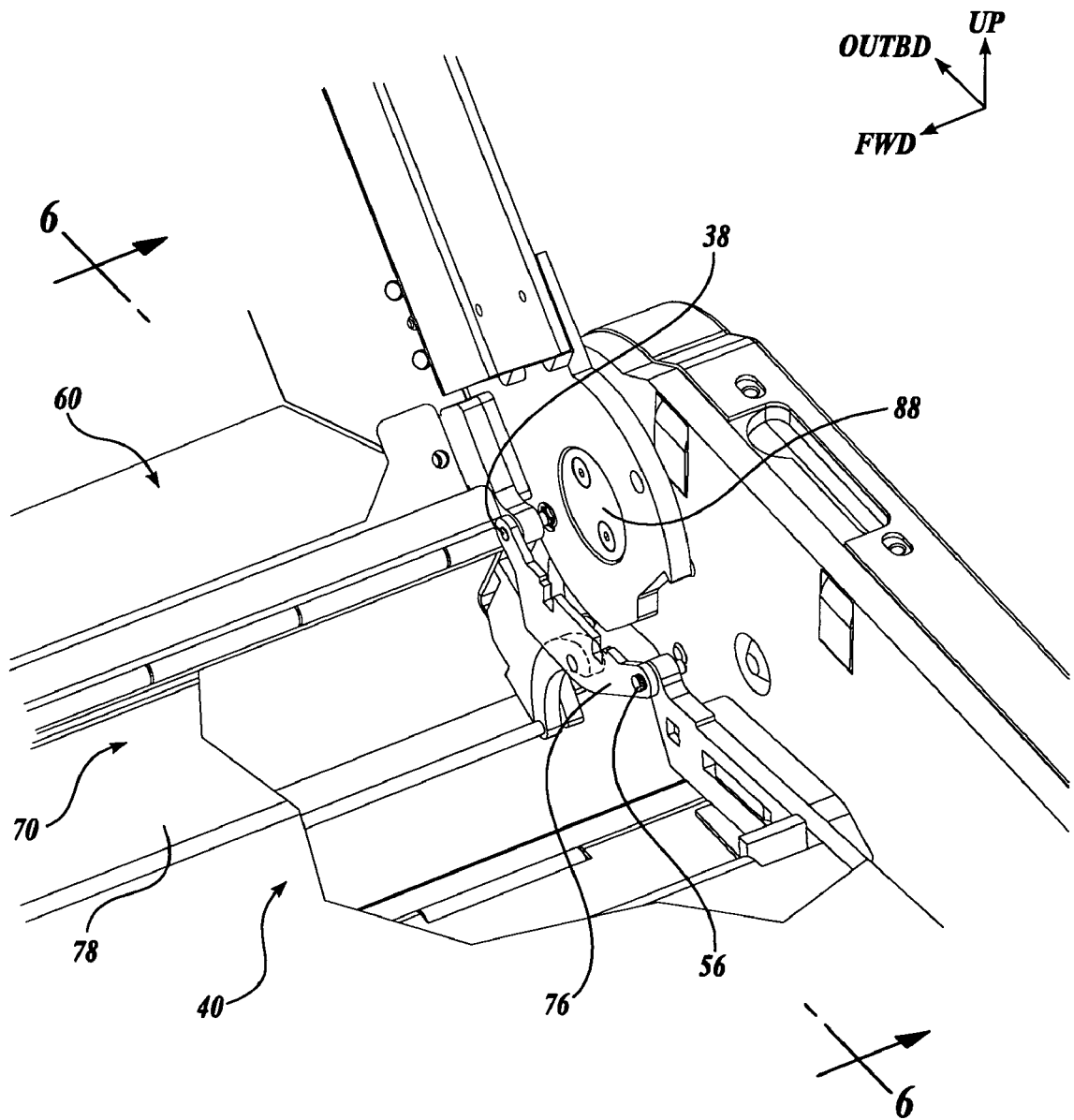
FIG. 4 is an isometric, partial cut-away view of an outboard support of a movable floor of the ramp assembly shown in FIG. 3.
Figure 5:
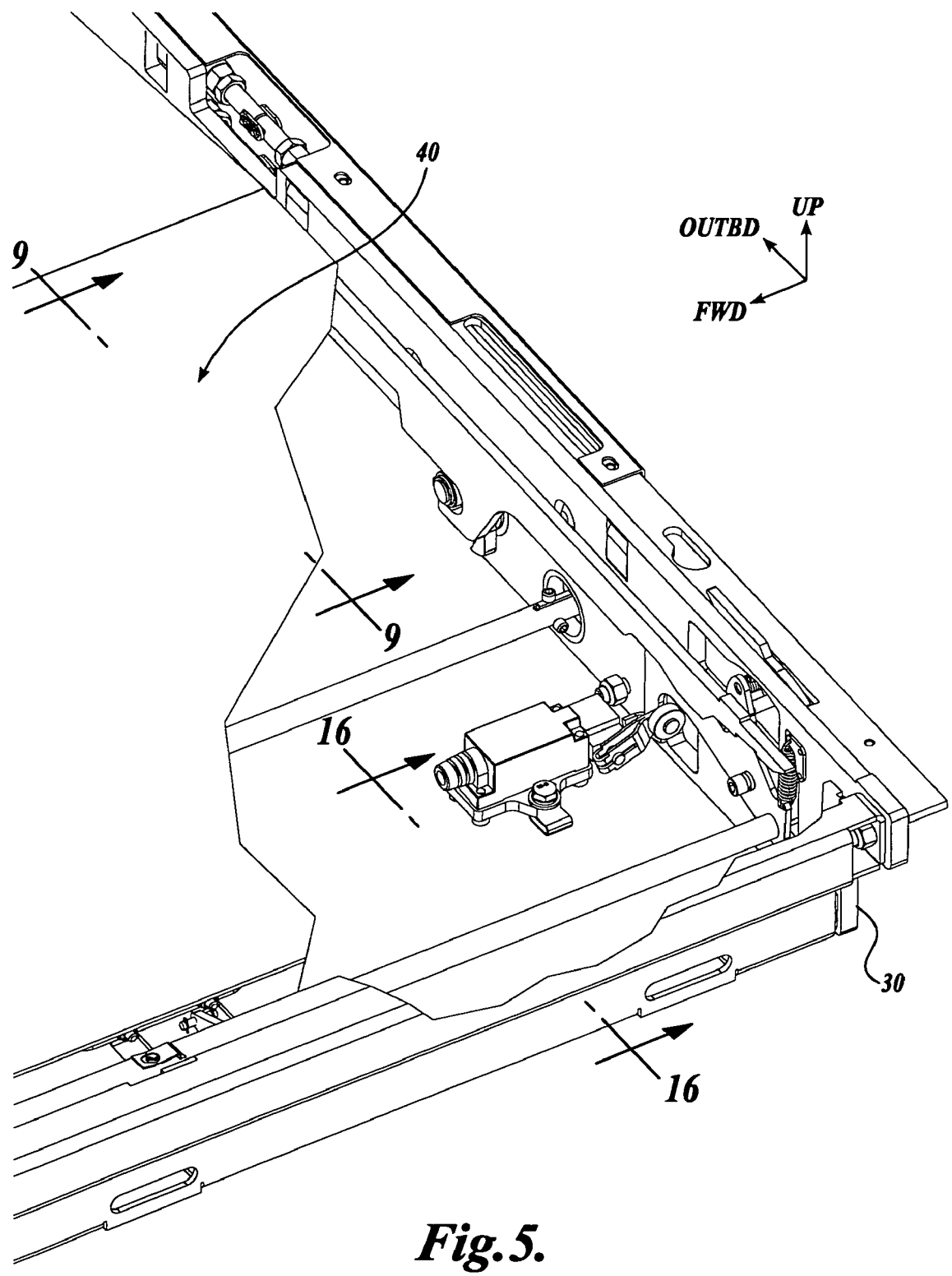
FIG. 5 is an isometric, partial cut-away view of an inboard support of the movable floor of the ramp assembly shown in FIG. 3.

Referring back to FIG. 2, a gap exists between the first end 61 of the ramp portion 60 and the outboard end of the movable floor 40. The intermediate panel assembly 70 bridges this gap and provides a transition surface between the ramp portion 60 and the movable floor 40. As best shown in FIGS. 3 and 4, the intermediate panel assembly 70 includes a panel 78 supported at the forward and rear sides by a pair of side supports 76.

The outboard end 74 of the intermediate panel assembly 70 is hingedly coupled to the first end 61 of the ramp portion 60 about a first hinge axis 34. As best shown in FIGS. 6-8, hinge pins 38 are located at the forward and rear sides of the first end 61 of the ramp portion 60 to hingedly attach the first end 61 of the ramp portion 60 to the side support 76 of the intermediate panel assembly 70. The hinge pins 38 are positioned so that the hinge axis 34 is substantially parallel to, but offset from, the axis of rotation of the outboard sprockets 88. As a result, the hinge axis 34, and thus the outboard end 74 of the intermediate panel assembly 70, moves in an arcuate path around the centerline of the outboard sprocket 88 when the ramp portion 60 moves between the stowed position and a deployed position.

The inboard end 72 of the intermediate panel assembly 70 is hingedly coupled to the outboard end of the movable floor 40 about a second hinge axis 36. As best shown in FIGS. 6-8, hinge pins 56 are located along the second hinge axis 36 at the forward and rear sides of the outboard end of the movable floor 40 to hingedly attach the outboard end of the movable floor 40 to the side support 76 of the intermediate panel assembly 70. The second hinge axis 36 is substantially parallel to, but offset from, the axis of rotation of the outboard sprockets 88.

When the ramp portion 60 is in a deployed position, the outboard portion 44 of the movable floor 40 extends from the inboard portion 42 of the movable floor 40 in an outboard and downward direction to the outboard edge of the movable floor 40 so that the outboard portion 44 of the movable floor 40 has a slope approximately equal to the slope of the ramp portion 60. The outboard portion 44 of the movable floor 40 is also approximately parallel to the ramp portion 60 so that the intermediate panel assembly 70 also has a slope similar to the outboard portion 44 of the movable floor 40 and to the ramp portion 60. It should be appreciated that some variations in the slopes of the ramp portion 60, the intermediate panel assembly 70, and the outboard portion 44 of the movable floor 40 may result from different distances between the floor of the vehicle and the curb or street surfaces.

As a result of the above-described configuration, the outboard portion 44 of the movable floor 40 and the intermediate panel assembly 70 effectively increase the overall length of the sloped portion of the deployed ramp. Consequently, a more gradual slope is achieved without increasing the length of the ramp portion 60. Because the length of the ramp portion 60 is not increased, the torque required from the drive motor 82 to reciprocate the ramp portion 60 between the stowed position and a deployed position is not increased.

The drive assembly 80 actuates the ramp portion 60. As a result, the ramp portion 60 reciprocates between the stowed position and a deployed position. A forward portion of the drive assembly is located on the forward side of the frame 30. A rear portion of the drive assembly 80 is similarly located on the rear side of the frame 30, wherein each element of the forward portion of the drive assembly 80 corresponds to a similar element of the rear portion of the drive assembly 80. For the sake of clarity, the forward portion of the drive assembly 80 is described herein with the understanding that unless otherwise indicated, each element of the forward portion has a corresponding element on the rear portion of the drive assembly 80.

Referring to the embodiment shown in FIGS. 1 and 2, the drive assembly 80 includes an inboard sprocket 86 that is rotatably coupled to the inboard end of the forward side of the frame 30. The inboard sprocket 86 is oriented to have an axis of rotation that extends in the forward/rearward direction. The drive assembly 80 also includes an outboard sprocket 88 rotatably coupled to the outboard end of the forward side of the frame 30. The outboard sprocket 88 is oriented to have an axis of rotation that is substantially parallel to the axis of rotation of the inboard sprocket 86. A drive chain 92 forms an endless loop that engages the teeth of the outboard sprocket 88 and the teeth of the inboard sprocket 86. Movement of the drive chain 92 along the path of the drive chain 92 rotates the inboard sprocket 86 and the outboard sprocket 88.

Figure 12:
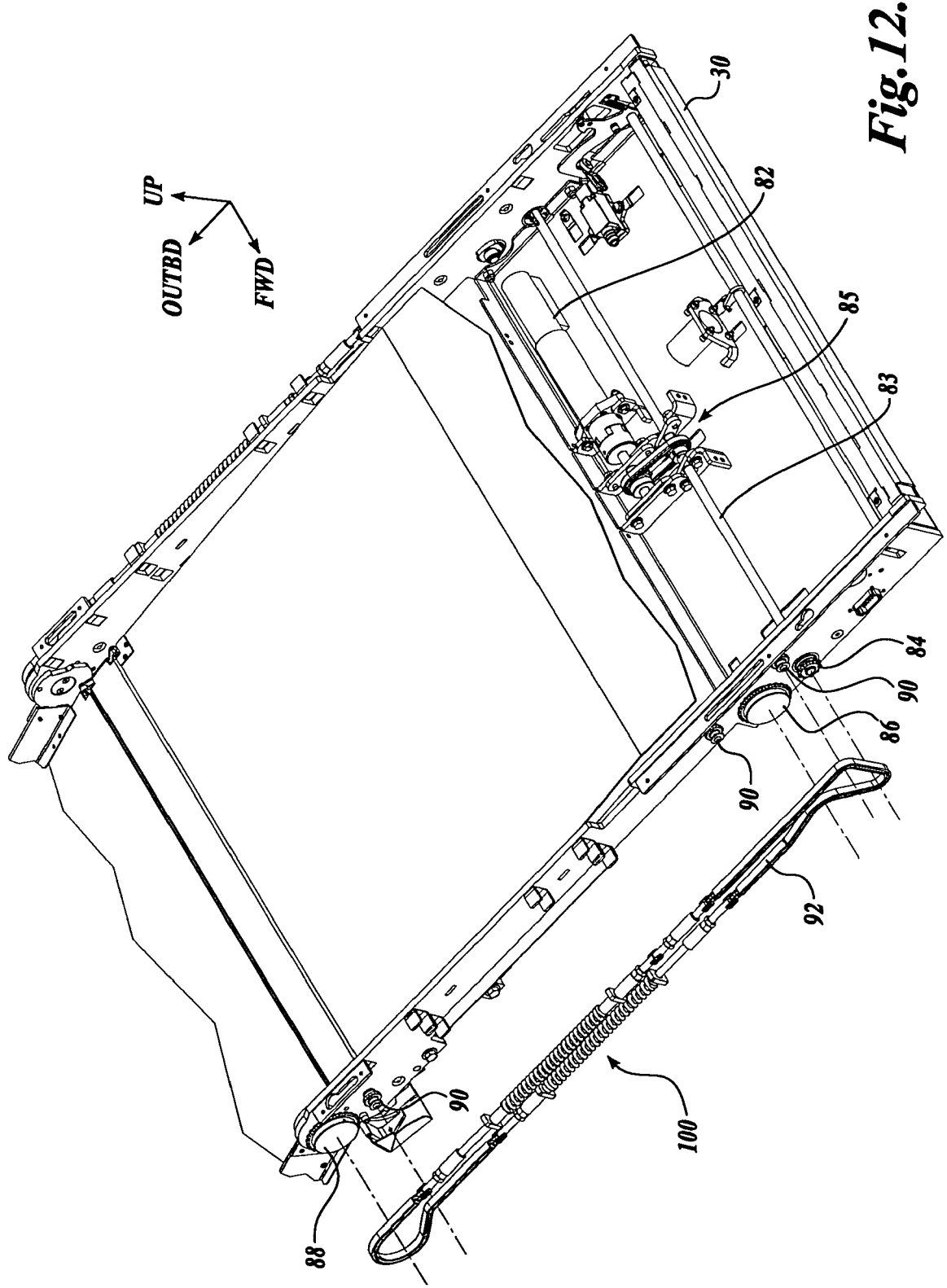
FIG. 12 is an isometric, partial cut-away view of the ramp assembly shown in FIG. 1, with the ramp assembly in a deployed position.

The drive assembly 80 further includes drive sprocket 84 rotatably coupled to the forward side of the frame 30 intermediate to the inboard sprocket 86 and outboard sprocket 88. The drive sprocket 84 is oriented to have an axis of rotation substantially parallel to the axes of rotation of the inboard sprocket 86 and outboard sprocket 88. As shown in FIG. 12, a drive shaft 83 is coupled to the drive sprocket 84 for connecting the drive sprocket 84 to a motor 82, wherein the drive shaft 83 is operatively coupled to the motor 82 by a well known transmission means 85. The motor 82 is selectively operated to rotate the drive sprocket 84, thereby driving the inboard sprocket 86 and the outboard sprocket 88 via the drive chain 92. In one embodiment, a single motor 82 drives the drive sprocket 84 of the forward portion of the drive assembly 80 and also the drive sprocket 84 of the rear portion of the drive assembly 80. In another embodiment, each drive sprocket 84 is driven by a separate motor 82.

One or more idler sprockets 90 may be included in the drive assembly 80. The optional idler sprockets 90 engage the drive chain 92 to redirect the drive chain 92 along a predetermined path. The drive chain 92 includes a turnbuckle 98 that is selectively adjustable to increase or decrease the length of the drive chain 92 in order to adjust the tension of the drive chain 92.

As illustrated in FIGS. 6-11, the inboard sprockets 86 and outboard sprockets 88 of the drive assembly 80 rotate cooperatively to reciprocate the ramp assembly 20 between the stowed position and a deployed position. More specifically, the outboard sprockets 88 rotate to reciprocate the ramp portion 60 between the stowed position and a deployed position. At the same time, the inboard sprockets 86 and outboard sprockets 88 cooperate to arcuately raise and lower, and horizontally translate the movable floor 40 as the ramp portion 60 reciprocates between the stowed position and a deployed position.

Actuation of the Ramp Portion

FIGS. 6-8 illustrate the outboard sprocket 88 as it drives the ramp portion 60 from the stowed position (FIG. 6), through an intermediate position (FIG. 7), to a deployed position (FIG. 8). Referring to FIG. 6, a portion of the outboard sprocket 88 extends through the frame 30 to act as a ramp support element. The ramp portion 60 is fixedly attached to a portion of the outboard sprocket 88 that extends axially through the frame 30 into the interior portion of the frame 30. The lower surface 66 of the ramp portion 60, which faces up when the ramp assembly 20 is in the stowed position, is offset from the axis of rotation of the outboard sprocket 88 so that the lower surface 66 is generally horizontal and coplanar with the floor of the vehicle when the ramp assembly 20 is in the stowed position.

To move the ramp portion 60 from the stowed position to a deployed position, the outboard sprocket 88 is driven by the drive assembly 80 to rotate in a counterclockwise direction as viewed in FIG. 7 (i.e., the direction of the arrow shown in FIG. 7). The ramp portion 60 rotates with the outboard sprocket 88 until the tapered nose 64 of the ramp portion 60 contacts a surface 22 of the road or sidewalk, at which point the ramp portion 60 is in a deployed position.

Conversely, to move the ramp portion 60 from a deployed position to the stowed position, the drive assembly 80 rotates the outboard sprocket 88 in a clockwise direction as viewed in FIG. 7 (i.e., the direction opposite the arrow shown in FIG. 7). The ramp portion 60 rotates with the outboard sprocket 88 until the lower surface 66 of the ramp portion 60 is generally horizontal and coplanar with the floor of the vehicle, at which point the ramp portion 60 is in the stowed position. In the stowed position, the ramp portion is supported at its edges by the frame 30 or the vehicle floor. By selectively operating the motor 82 of the drive assembly 80, the ramp portion 60 is reciprocated between the stowed position and a deployed position.

Actuation of the Movable Floor i. Outboard End

As best shown in FIGS. 6-8, the outboard end of the movable floor 40 travels along a generally horizontal path in the inboard/outboard direction as the outboard sprocket 88 rotates to move the ramp portion 60 between the stowed position and a deployed position. A roller bearing 52 is rotatably mounted to the frame 30 and positioned within the frame 30 to contact a bearing surface 54 located on the outboard portion 44 of the movable floor 40. The bearing surface 54 is located on a lower surface of the movable floor 40 so that the roller bearing 52 contacts the bearing surface 54 from below, thereby providing support to the outboard end of the movable floor 40 in a vertical direction.

As shown in FIG. 6, when the ramp portion 60 is in the stowed position, the hinge pin 38 connecting the ramp portion 60 to the intermediate panel assembly 70 is located above the axis of rotation of the outboard sprocket 88. Referring to FIGS. 7 and 8, when the outboard sprocket 88 rotates, the hinge axis 34 of the hinged connection between the ramp portion 60 and the intermediate panel assembly 70 moves in an arcuate path around the axis of rotation of the outboard sprocket 88. This motion drives the outboard end 74 of the intermediate panel assembly 70, which, in turn, drives the inboard end 72 of the intermediate panel assembly 70. The movement of the inboard end 72 of the intermediate panel assembly 70 drives the outboard portion 44 of the movable floor 40, which is supported in a vertical direction by the roller bearing 52.

When the ramp portion 60 is moved from a deployed position to the stowed position, the hinge pin 38 moves in a clockwise direction, driving the intermediate panel assembly 70 and the outboard portion 44 of the movable floor 40 in the reverse direction of the path traveled when the ramp portion 60 is being deployed.

ii. Inboard End

Figure 10:
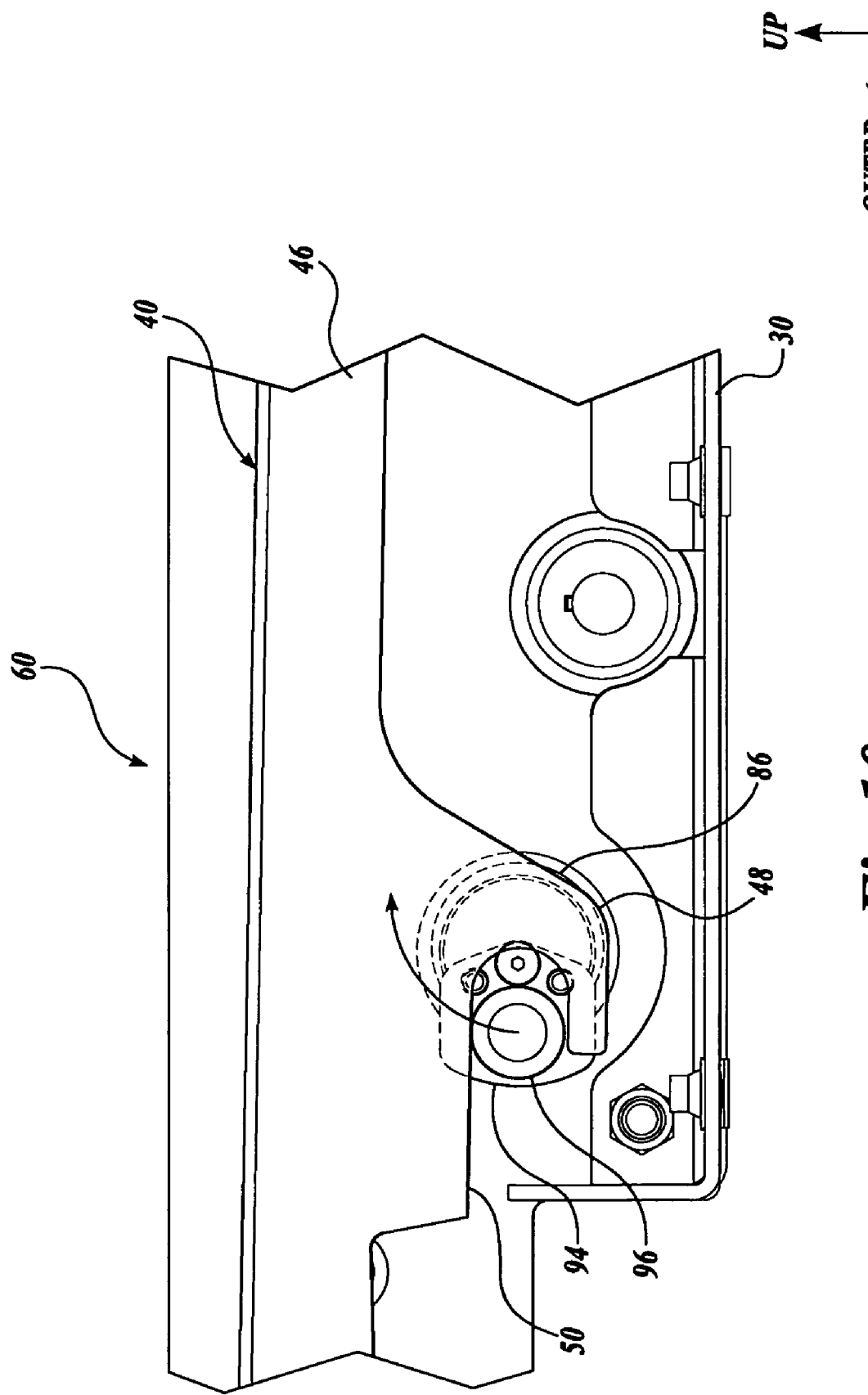
FIG. 10 is a partial cross-sectional side view of the inboard support of the movable floor of the ramp assembly shown in FIG. 5, with the ramp portion positioned between the stowed position and a deployed position.
Figure 11:
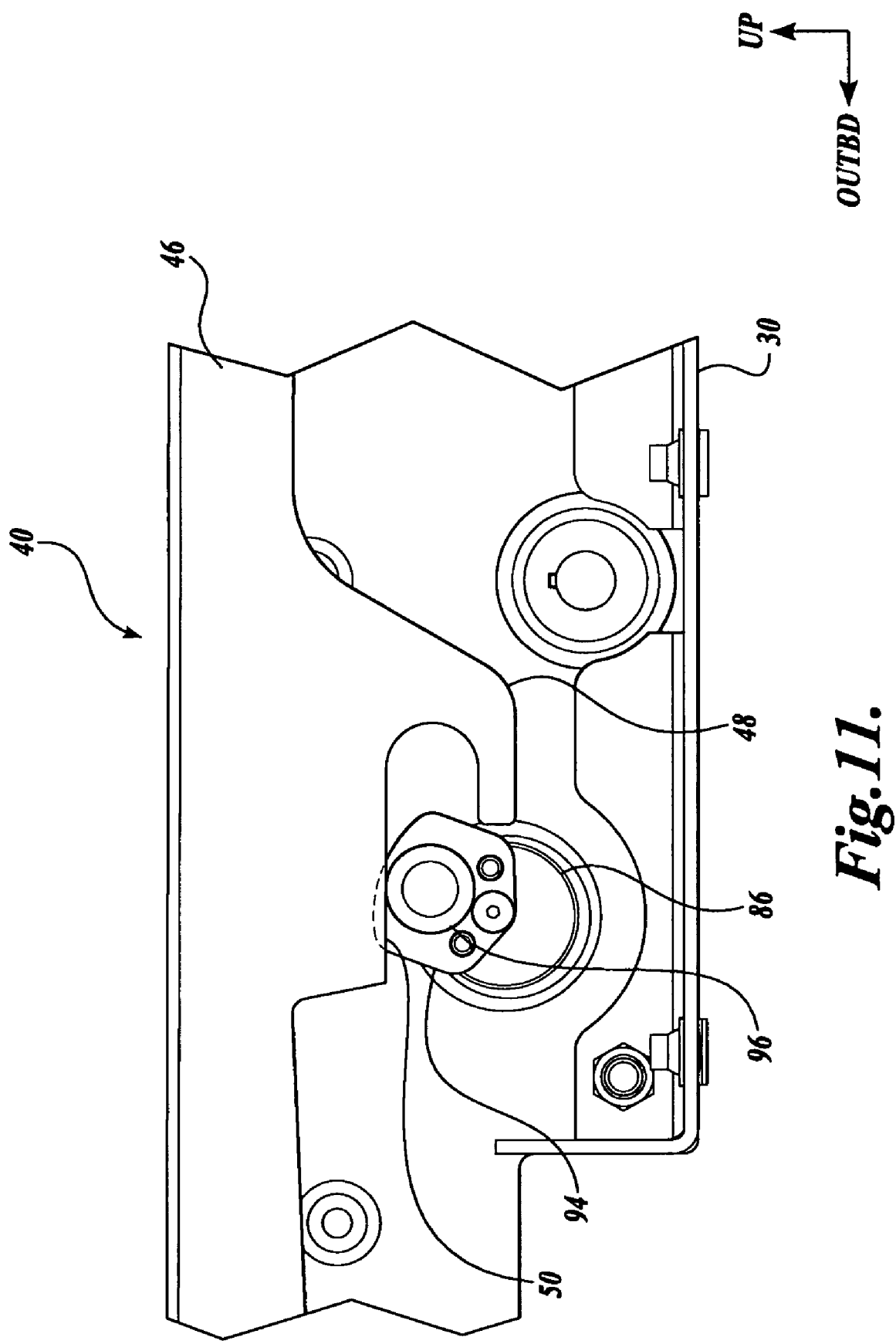
FIG. 11 is a partial cross-sectional side view of the inboard support of the movable floor of the ramp assembly shown in FIG. 5, with the ramp portion in a deployed position.

FIGS. 9-11 illustrate the inboard sprocket 86 as it raises the inboard end of the movable floor 40 as the ramp portion 60 moves from the stowed position (FIG. 9), through an intermediate position (FIG. 10), to a deployed position (FIG. 11). Referring to FIG. 9, a first end of a link 94 is fixedly coupled to the inboard sprocket 86. The link 94 extends radially from the inboard sprocket 86 so that the second end of the link 94 revolves around the axis of rotation of the inboard sprocket 86 as the inboard sprocket 86 is rotated by the drive assembly 80. A follower bearing 96 is rotatably coupled to the second end of the link 94 so that the axis of rotation of the follower bearing 96 is approximately parallel to the axis of rotation of the inboard sprocket 86. The follower bearing 96 travels in an arcuate path around the axis of rotation of the inboard sprocket 86 when the drive assembly 80 drives the inboard sprocket 86. The inboard sprocket 86, the link 94, and the follower bearing 96 cooperate to function as a reciprocating mechanism to reciprocate the inboard end of the movable floor 40 between a raised position and a stowed position.

A side support 46 extends along the lower edge of the movable floor 40 from the inboard end of the movable floor 40 to the outboard end of the movable floor 40. The side support 46 includes a protrusion that extends from the inboard portion of the side support 46 in an outboard and downward direction to form a C-shaped catcher 48. The catcher 48 opens toward the outboard end of the ramp assembly 20. The lower portion of the side support that is located outboard of the catcher 48 includes a bearing surface 50.

As shown in FIG. 9, when the ramp portion 60 is in the stowed position, the link 94 extends downward from the inboard sprocket 86. As a result, the follower bearing 96 is positioned below the axis of rotation of the inboard sprocket 86. The follower bearing 96 engages the bearing surface 50 of the side support 46, thereby supporting the inboard end of the movable floor 40. If external forces tend to raise the inboard end of the movable floor 40, the follower bearing 96 engages the catcher 48, thereby preventing the side support 46, and therefore the movable floor 40, from moving in an upward direction. The catcher 48 also restrains the movable floor 40 to reduce unwanted noise and vibration when the vehicle is in motion.

Referring to FIG. 10, when the ramp portion 60 moves from the stowed position to a deployed position, the inboard sprocket 86 rotates in a clockwise direction. As the follower bearing 96 travels along an arcuate path as a result of the motion of the inboard sprocket 86, the follower bearing 96 maintains contact with the bearing surface 50. Thus, the follower bearing 96 provides continuous support to the inboard end of the movable floor 40 as the follower bearing 96 travels along an arcuate path, thereby raising the inboard end of the movable floor 40.

FIG. 11 shows the inboard end of the movable floor 40 when ramp portion 60 is in a deployed position. The follower bearing 96 is generally positioned above the axis of rotation of the inboard sprocket 86 and is disposed within the catcher 48. The follower bearing 96 supports the side support 46 of the movable floor 40 so that the upper surface of the movable floor 40 is generally horizontal and coplanar with the floor of the vehicle.

When the ramp portion 60 is moved from a deployed position to the stowed position, the inboard sprocket 86 rotates in a counterclockwise direction as viewed in FIG. 10 (i.e., the direction opposite the arrows shown in FIG. 10), and the follower bearing 96 travels in a downward arcuate path. The inboard end of the movable floor 40, which is supported by the follower bearing 96, travels downward with the follower bearing 96 until the ramp portion 60 is in the stowed position. When the ramp portion 60 is in the stowed position, the inboard end of the movable floor 40 is disposed within the frame 30 in a lowered position.

As previously discussed, the drive chain 92 coordinates the rotation of the inboard sprocket 86 and the outboard sprocket 88. Accordingly, the inboard sprocket 86 and the outboard sprocket 88 cooperate to control the position of the movable floor 40.

When the ramp portion 60 is in a deployed position, the sloped portion of the ramp assembly 20 has a slope defined as ratio of the height (rise) of the sloped portion to the horizontal length (nm) of the sloped portion. To provide a slope that is gradual enough to allow safe ingress to and egress from the vehicle by a person in a wheelchair, the ratio of rise to run is generally no greater than 1:4. Smaller ratios, such as 1:5, 1:6, and 1:7 are preferable from a safety standpoint, but given vehicle floor height constraints, smaller ratios generally require longer ramps, which result in larger actuation motors and more space required within the vehicle to stow the ramps. Although embodiments are not limited to any particular ratio, a ratio of 1:6 has been found to provide a balance between the increased safety of a more gradual slope and the design constraints inherent in a longer ramp.

Counterbalance Assembly

Figure 13:
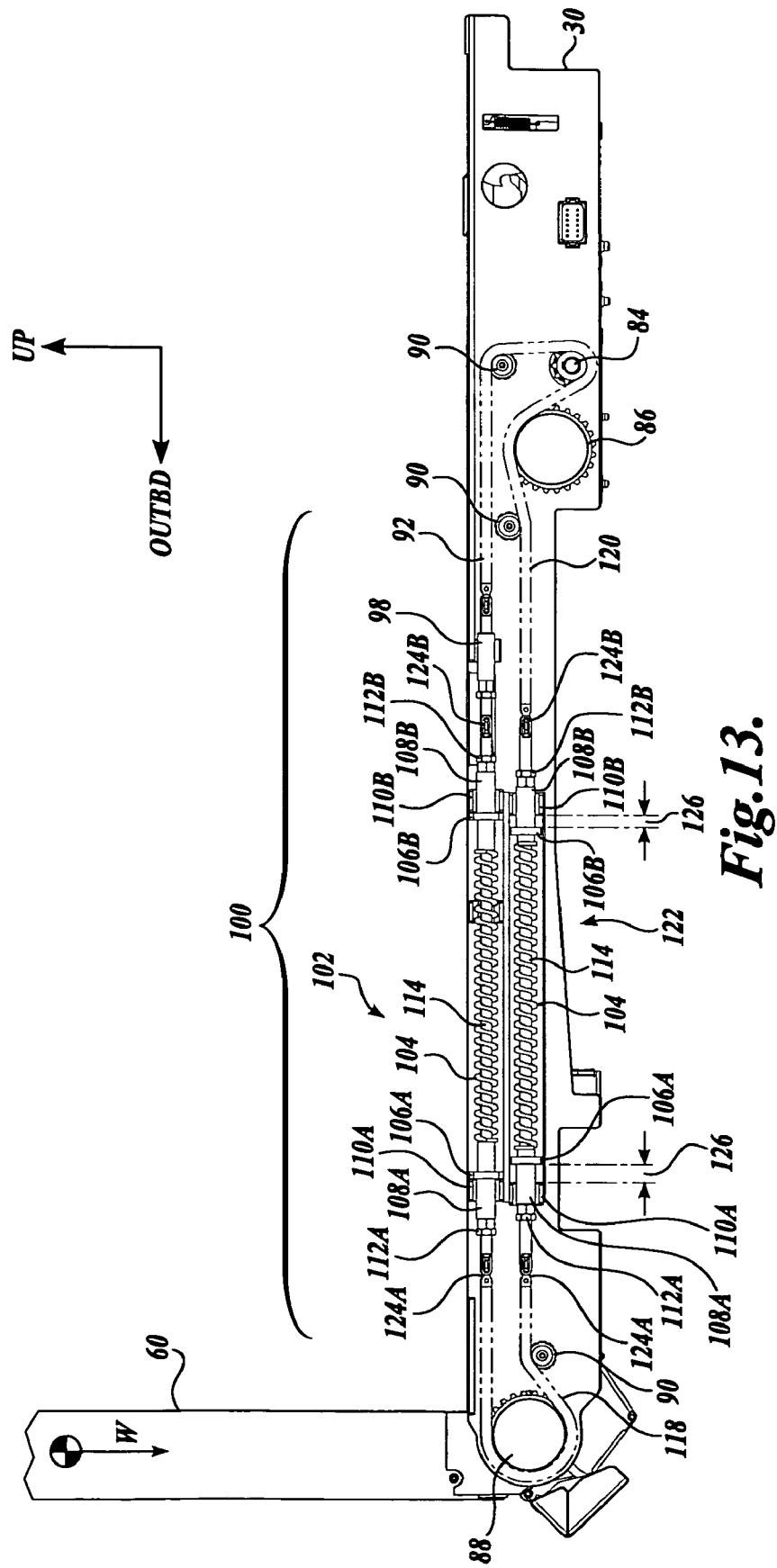
FIG. 13 is a partial side view of the ramp assembly shown in FIG. 1, with the ramp portion in a neutral position.
Figure 14:
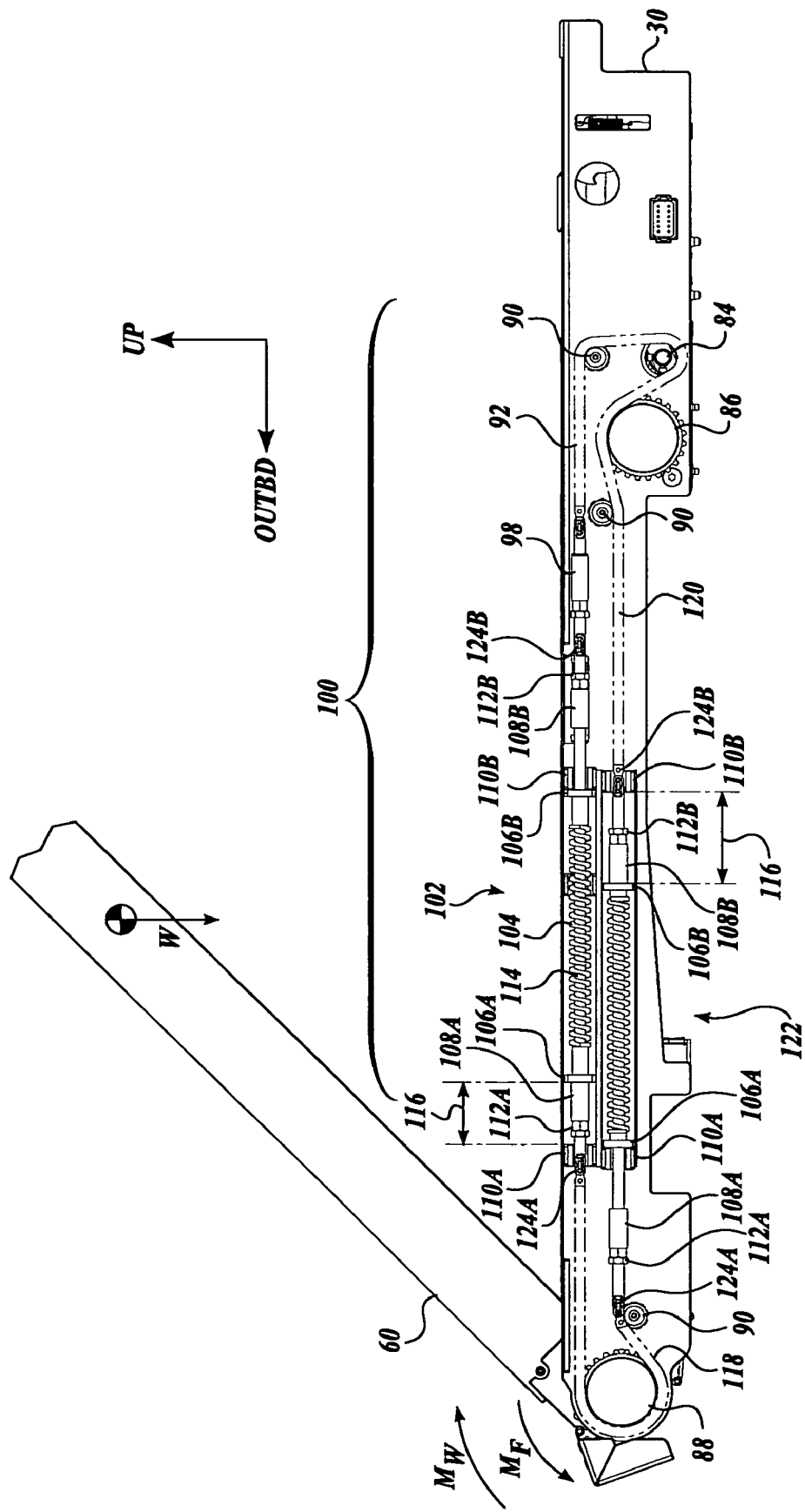
FIG. 14 is a partial side view of the ramp assembly shown in FIG. 1, with the ramp portion positioned between a neutral position and the stowed position.
Figure 15:
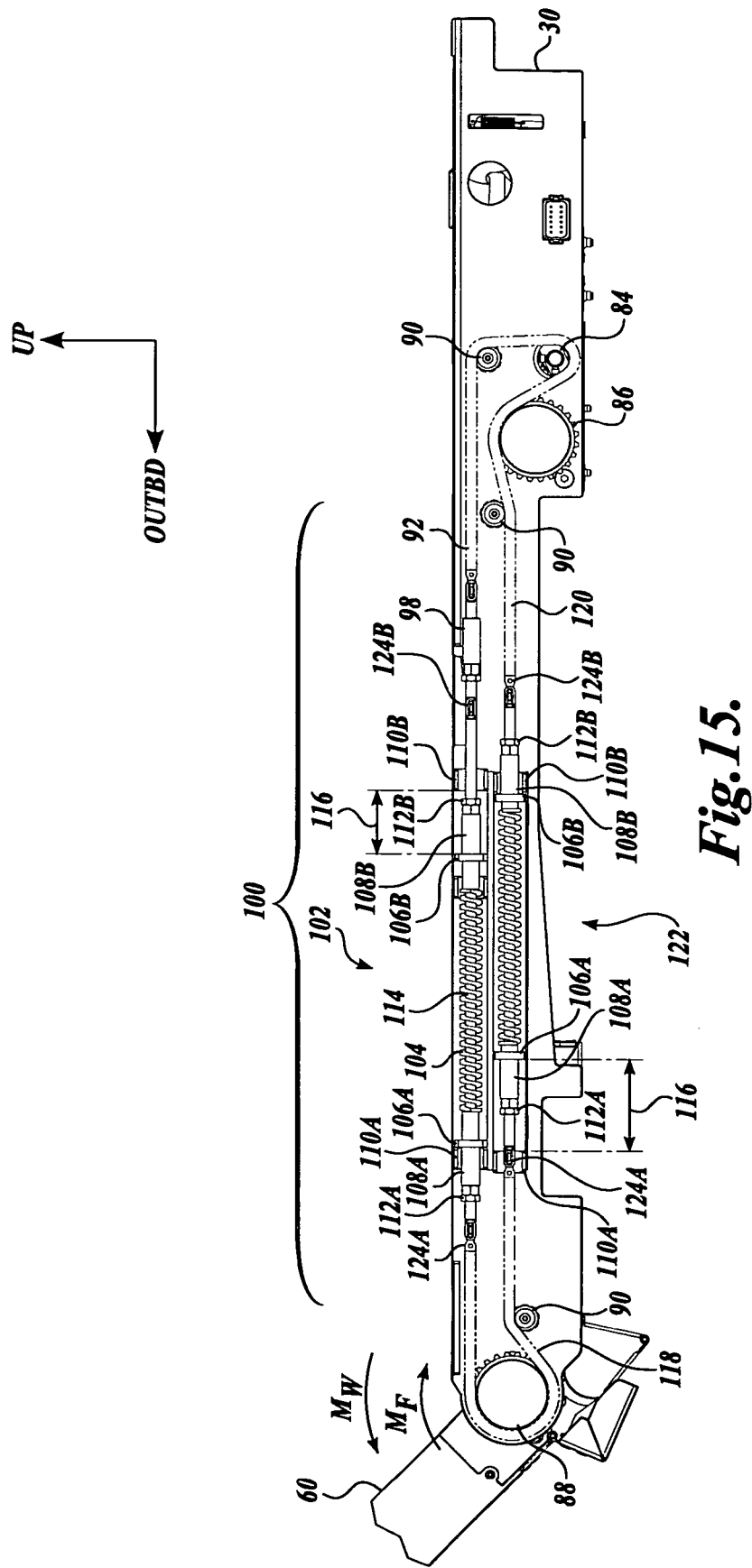
FIG. 15 is a partial side view of the ramp assembly shown in FIG. 1, with the ramp portion positioned between a neutral position and a deployed position.

FIG. 13 illustrates the ramp portion 60 in a position between the stowed position and a deployed position. In the illustrated position, the ramp portion 60 forms an angle of approximately 90° with the frame 30. The center of gravity (CG) of the ramp portion 60 is located approximately over the axis of rotation of the outboard sprocket 88 when the ramp portion is in this "neutral" position. In the illustrated embodiments, the weight of the ramp is idealized as a point load W applied at the CG of the ramp portion 60. When the ramp portion 60 is in the neutral position, the weight of the ramp portion 60 does not impart a moment $M_W$ about the axis of rotation of the outboard sprocket 88. FIG. 14 shows the ramp portion 60 at a position between the neutral position and the stowed position. When the ramp portion is so positioned, the CG of the ramp portion 60 is located inboard of the axis of rotation of the outboard sprocket 88. Accordingly, the weight W of the ramp portion 60 imparts moment $M_W$ about the axis of rotation of the outboard sprocket 88, wherein the moment $M_W$ tends to move the ramp portion 60 toward the stowed position. FIG. 15 shows the ramp portion 60 at a position between the neutral position and a deployed position. In this position, the CG of the ramp portion 60 is located outboard of the axis of rotation of the outboard sprocket 88. As a result, the weight W of the ramp portion 60 imparts moment $M_W$ about the axis of rotation of the outboard sprocket 88, wherein the moment $M_W$ tends to move the ramp portion toward a deployed position. Although the neutral position is illustrated as a position wherein the ramp portion 60 is positioned an angle of approximately 90° from the frame 30, it should be understood that the position of the CG of the ramp portion 60 can vary, resulting in a neutral position wherein the angle of the ramp portion to the frame 30 is greater than or less than 90°.

As shown in FIGS. 13-15, the ramp assembly 20 may include a counterbalance assembly 100 to counteract the moment $M_W$ imparted about the axis of rotation of the outboard sprocket 88 by the weight of the ramp. The counterbalance assembly provides a moment $M_F$ that opposes the moment $M_W$ produced by the ramp portion 60. Because the moment $M_W$ is counteracted by the moment $M_F$ provided by the counterbalance assembly 100, the torque output required from the motor 82 of the drive assembly 80 is reduced. The reduced torque requirement allows for the use of a smaller motor 82.

In the embodiment illustrated in FIGS. 13-15, the counterbalance assembly 100 includes an upper spring assembly 102 and a lower spring assembly 122 on each of the forward and rear sides of the ramp assembly 20, for a total of four spring assemblies. For the sake of clarity, the upper and lower spring assemblies 102, 122 located on the forward side of the ramp assembly 20 are described with the understanding that similar upper and lower spring assemblies 102, 122 are located on the rear side of the ramp assembly 20.

Referring to FIG. 13, the upper and lower spring assemblies 102, 122 are attached in series to segments of the drive chain 92. More specifically, the outboard end of the upper spring assembly 102 is coupled to the upper end of an outboard chain segment 118, and the inboard end of the upper spring assembly 102 is coupled to the upper end of an inboard chain segment 120. The outboard end of the lower spring assembly 122 is coupled to the lower end of the outboard chain segment 118, and the inboard end of the lower spring assembly 122 is coupled to the lower end of the inboard chain segment 120. In this manner, a drive chain is formed into an endless loop, wherein the loop comprises the following components in order: outboard chain segment 118, upper spring assembly 102, inboard chain segment 120, and lower spring assembly 122.

The lower spring assembly 122 includes a rigid rod 114 positioned in an inboard/outboard orientation. The outboard end of the rod 114 is coupled to the lower end of the outboard chain segment 118 with a pinned connection at 124A. Similarly, the inboard end of the rod 114 is coupled to the lower end of the inboard chain segment 120 with a pinned connection at 124B. A helical compression spring 104 is concentrically arranged with respect to the rod 114 so that the rod 114 is disposed within the center of the coils of the spring 104.

The lower spring assembly 122 further includes a spring fitting 106A, a cylindrical bushing 108A, and an adjustment nut 112A associated with the outboard end region of the rigid rod 114. The spring fitting 106A has an aperture with a diameter larger than the outer diameter of the rod 114, but smaller than the outer diameter of the compression spring 104. The spring fitting 106A is slidingly coupled to the outboard end of the rod 114 so that the rod passes through the aperture of the spring fitting 106A. The cylindrical bushing 108A (biasing element) is coupled to the rod 114 so that a portion of the rod 114 is disposed within the bore of the bushing 108A. Thus, the outboard end of the compression spring 104 bears against the inboard surface the spring fitting 106A, and the outboard surface of the spring fitting 106A bears against the inboard surface of the cylindrical bushing 108A. The adjustment nut 112A threadedly engages a threaded portion of the outboard end of the rod 114. The inboard end of the adjustment nut 112A engages the outboard end of the cylindrical bushing 108A, preventing the cylindrical bushing 108A, the spring fitting 106A, and the outboard end of the compression spring 104 from moving in an outboard direction relative to the rod 114.

Similar to the outboard end of the rod 114, a spring fitting 106B, a bushing 108B, and an adjustment nut 112B are attached to the inboard end of the rod 114. That is, the spring fitting 106B is installed inboard of the compression spring 104, the bushing 108B (biasing element) is installed inboard of the spring fitting 106B, and the adjustment nut 112B installed inboard of the bushing 108B.

Still referring to FIG. 13, the compression spring 104 of the described lower spring assembly 122 is compressed between the two spring fittings 106A-B. The combination of the spring fittings 106A-B, bushings 108A-B, and nuts 112A-B prevents the compressed spring from expanding in either the inboard or outboard direction. Further, the preload on the compressed spring 104 can be adjusted by selectively adjusting the distance between the adjustment nuts 112A-B. As the distance between the nuts 112A-B is decreased, the spring 104 is further compressed, increasing the preload on the spring 104. Conversely, if the distance between the nuts 112A-B is increased, the spring 104 expands, and the preload on the spring 104 is decreased.

The compression spring 104 and spring fittings 106A-B are disposed between the inboard and outboard end stops 110A-B. Each end stop 110A-B includes a pair of protrusions to define a channel therebetween. Each channel is positioned in the direction of the compression spring and is sized to allow the bushings 108A-B and adjustment nuts 112A-B to pass therethrough. The spring fittings 106A-B, however, are sized so as not to pass through the channels, but instead remain disposed between the inboard and outboard end stops 110A-B.

The upper spring assembly 102 is identical to the lower spring assembly 122 with one exception. In the illustrated embodiment shown in FIGS. 13-15, the inboard end of the rod 114 is coupled to one end of a turnbuckle 98. The other end of the turnbuckle 98 is coupled to the upper end of the inboard chain segment 120. The tension of the drive chain 92 is selectively adjustable by rotating the turnbuckle 98. Although the turnbuckle 98 is illustrated attached to the inboard end of the upper spring assembly 102, it should be understood that the turnbuckle can be located at any position along the path of the drive chain 92 that does not interfere with the spring assemblies 102, 122 or the sprockets of the drive assembly 80.

FIG. 14 shows the ramp assembly 20 with the ramp portion 60 located between a neutral position and the stowed position. As the ramp portion 60 moves toward the stowed position, the CG of the ramp portion moves inboard, imparting a moment $M_W$ that tends to move the ramp portion 60 into the stowed position. Moreover, as the ramp portion 60 moves further towards the stowed position, the horizontal distance between the axis of rotation of the ramp portion 60 and the CG of the ramp portion 60 increases, thus increasing the magnitude of the moment $M_W$ on the outboard sprocket 88.

The moment $M_W$ imparted by the weight W of the ramp portion 60 is counteracted by compression of the springs 104 of the upper and lower spring assemblies 102, 122. Referring to FIG. 14, as the ramp portion 60 moves toward the stowed position, the drive chain 92 moves in a clockwise direction along its path. With regard to the upper spring assembly 102, the clockwise motion of the drive chain 92 drives the outboard adjustment nut 112A, which is threadedly secured to the rod 114, in an inboard direction. As the nut 112A moves inboard, it drives the bushing 108A and the spring fitting 106A inboard, creating a gap 116 between the outboard end of the spring fitting 106A and the inboard end of the end stop 110A. The inboard end of the spring fitting 106A bears against the outboard end of the compression spring 104 so that the outboard end of the compression spring 104 moves inboard with the spring fitting 106A. At the inboard end of the upper spring assembly 102, the bushing 108A and the adjustment nut 112A move inboard with the drive chain 92 and the rod 114. The spring fitting 106B, and therefore the inboard end of the compression spring 104, are prevented from moving inboard by the inboard end stop 110B.

As described above, movement of the ramp portion 60 from a neutral position to the stowed position causes the outboard end of the upper compression spring 104 to move inboard, while the inboard end remains fixed against the inboard end stop 110B. The resulting compression of the spring 104 creates a force that, combined with the forces created by the other springs, imparts the moment $M_F$ to resist the moment $M_W$ that results from the weight W of the ramp portion 60. The resistive force is approximately proportional to the amount by which the spring 104 is compressed, i.e., the spring is a linear spring. That is, greater spring compression results in a greater resistive force. As previously noted, the moment $M_W$ increases as the ramp portion 60 approaches the stowed position from a neutral position. The resistive force supplied by the spring 104 and therefore, the moment $M_F$ created by the spring resistive force, also increase as the ramp portion 60 approaches the stowed position. The increase in the moment $M_W$ is sinusoidal, while the increase in the moment $M_F$ is linear. As described below in further detail, the counterbalance assembly 100 can be configured such that $M_F$ more closely approximates $M_W$ as the ramp reciprocates between the stowed position and a deployed position.

The springs 104 of the counterbalance assembly 100 are preferably selected to minimize the difference between the force supplied by the springs 104 and the force required to counteract the moment $M_W$ as the ramp portion 60 reciprocates between a stowed position and a deployed position. For linear springs, the spring stiffness can be selected such that the linear increase in spring resistance is a best fit of the sinusoidal increase of the moment $M_F$. As a result, the difference between $M_W$ and $M_F$ is minimized. In other embodiments, non-linear springs are used so that the resistance supplied by the spring increases at a non-linear rate, allowing the spring resistance to match more closely the force required to resist the moment $M_F$ as the ramp portion 60 reciprocates between a stowed position and a deployed position. Non-linear springs are known in the art. For example, a spring formed with a variable coil pitch will exhibit non-linear properties. It should be understood that various known spring configurations providing linear or non-linear reactive force can be included in the counterbalance assembly 100 without departing from the spirit and scope of the present invention. In addition, alternate systems can be used to provide a resistive force, such as pneumatic systems, hydraulic systems, and other systems known in the art.

The lower spring assembly 122 functions in the same manner as the upper spring assembly 102. As the ramp portion 60 moves from a neutral position to the stowed position, the inboard spring fitting 106B moves outboard to compress the spring 104 against the outboard spring fitting 106A, which is prevented from moving in the outboard direction by the outboard end stop 110A. The compression of the spring 104 results in a force that resists the moment $M_W$ resulting from the weight of the ramp portion 60.

The resistive forces produced by the upper and lower spring assemblies 102, 122 act on the drive chain 92 in a direction opposite to the moment $M_W$. As the moment $M_W$ shown in FIG. 14 tends to move the drive chain 92 in a clockwise direction, the resistive forces produced by the upper and lower spring assemblies 102, 122 impart a moment $M_F$ that tends to move the drive chain in a counterclockwise direction. To the extent that the resistive forces counteract the moment $M_W$, the torque required from the motor 82 to drive the drive assembly 80 is reduced.

FIG. 15 illustrates the ramp assembly 20 with the ramp portion 60 located between a neutral position and a deployed position. The CG (not shown) of the ramp portion 60 is located outboard of the axis of rotation of the ramp portion 60, creating a moment $M_W$ that tends to move the ramp portion 60 into the deployed position. The upper and lower spring assemblies are compressed in a similar fashion as discussed with respect to FIG. 14, but in an opposite direction. More specifically, as the moment $M_W$ tends to move the drive chain 92 in a counterclockwise direction, the upper and lower spring assemblies 102, 122 provide resistive forces that create a moment $M_F$ that tends to move the drive chain in a clockwise direction.

As previously noted, upper and lower spring assemblies 102, 122 are positioned on the forward and rear sides of the ramp assembly 20. The four spring assemblies cooperate to provide the moment $M_F$ that resists the moment $M_W$ created when the ramp is not in a neutral position, with each spring assembly providing approximately one fourth of the total resistive force.

The counterbalance assembly 100 can be configured so that the difference between the moment $M_F$ and the moment $M_W$ is minimized. More specifically, the preload in the springs 104, and the contact between the spring fittings 106A-B and the end stops 11A-B can be controlled so that the moment $M_F$ is not linear, but instead approximates the sinusoidal increase and decrease of the moment $M_W$.

Referring to FIG. 13, the illustrated counterbalance assembly 100 includes a lower spring assembly 122, wherein the inboard and outboard spring fittings 106A-B do not contact the end stops 110A-B when the ramp portion 60 is in the neutral position. As a result, a dead space 126 exists between the each spring fitting 106A-B and its respective end stop 110A-B. As the ramp portion 60 initially moves from the neutral position toward the stowed position, the outboard spring fitting 106A moves toward the outboard end stop 110A, reducing the amount of dead space 126. After the outboard spring fitting 106A contacts the outboard end stop 110A, the lower spring assembly begins to provide a resistive force. Similarly, when the ramp portion 60 moves from the neutral position toward a deployed position, the inboard spring fitting 106B travels toward the inboard end stop 110B. Only after the dead space 126 has been eliminated, i.e. when the inboard spring fitting 106B contacts the inboard end stop 110B, does the lower spring assembly 122 provide a resistive force.

The preload in the spring assemblies 102, 122 can be adjusted by selectively adjusting the nuts 112A-B to control compression of the springs 104. However, adjusting the preload in this manner also introduces dead space into the spring assemblies 102, 122. The preload in the spring assemblies 102 and 122 can also be adjusted independent of the dead space 126. In the illustrated embodiment, the spring fittings 106A-B are shown as flanged bushings. By increasing or decreasing the length of the cylindrical portion of the bushings, the space between the spring fittings, and thus, the preload on the spring 104 can be controlled independent of the distance from the bushing flange to its respective end stop 110, which defines the dead space.

Figure 16:
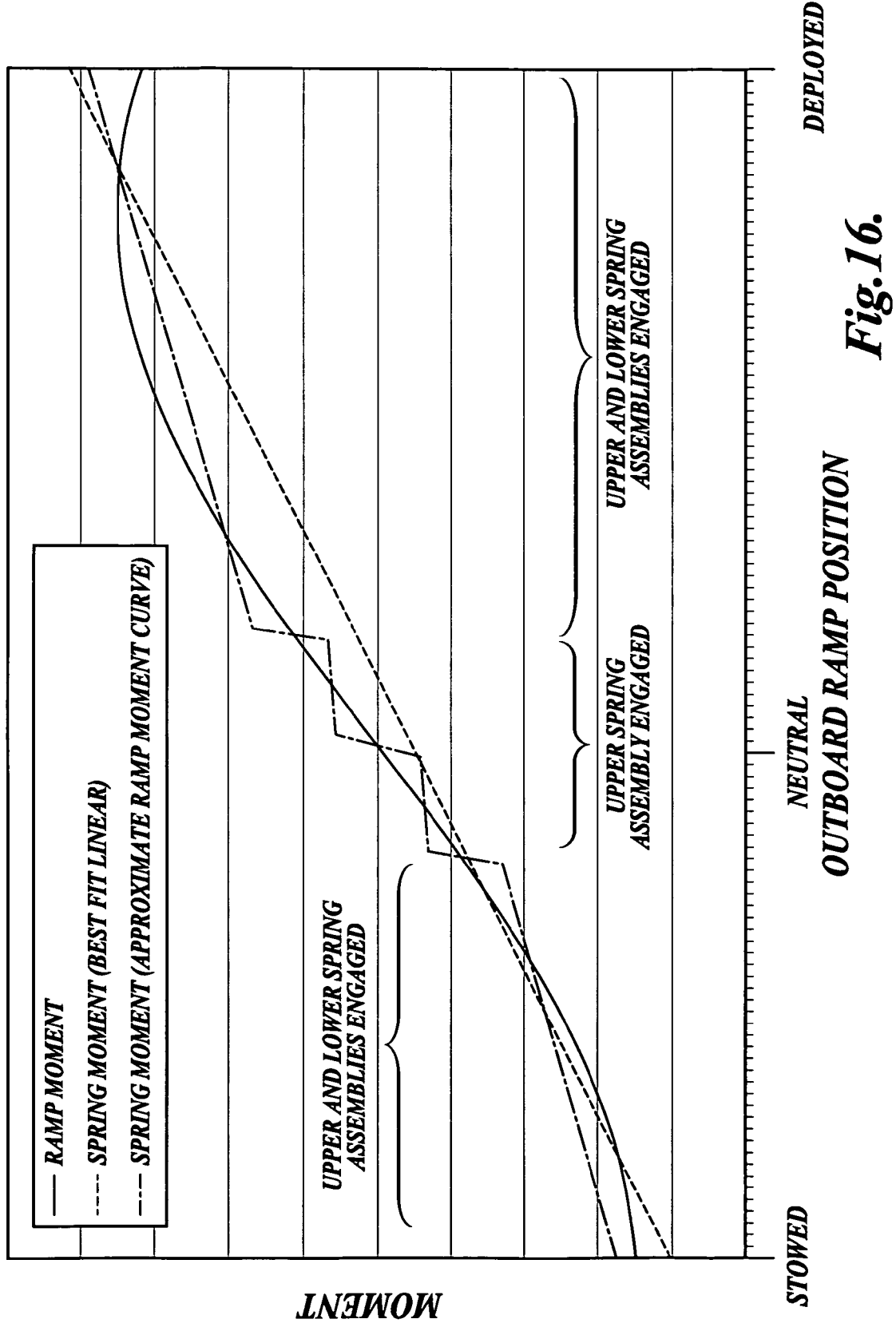
FIG. 16 is a chart showing a moment provided by a counterbalance of the ramp assembly of FIG. 13.

By adjusting the amount of dead space 126 and preload on the upper and lower spring assemblies 102 and 122, the moment $M_F$ can be made to more closely approximate the moment $M_W$ produced by the weight of the ramp. FIG. 16 is a chart illustrating the moment $M_F$ produced by the exemplary ramp assembly 20 illustrated in FIGS. 13-15 as the ramp assembly 20 reciprocates between the stowed position and a deployed position. A line representing the moment $M_F$ that is a linear best fit of the moment $M_W$ is also shown. The linear best fit represents the moment $M_F$ produced when the springs 104 have a zero preload, and no dead space 126 exists at the neutral position.

The chart shown in FIG. 16 further includes a series of lines representing an exemplary moment $M_F$ produced when a dead space 126 exists on the lower spring assembly 122, but not on the upper spring assembly 102. When the ramp portion 60 is at or near the neutral position, only the upper spring assembly 102 contributes to the moment $M_F$. As the ramp portion 60 moves toward the stowed position or a deployed position, the lower spring assembly is engaged, and the moment $M_F$ increases more rapidly, as shown by the increased slope of the line in the areas where both the upper and lower spring assemblies 102 and 122 are engaged. Further, the vertical discontinuities in the graph are achieved by preloading the springs 104 with adjustment nuts 112A-B.

As demonstrated in the exemplary embodiment of FIGS. 13-16, the moment $M_F$ supplied by the counterbalance assembly 100 can be controlled to more closely approximate the moment $M_W$ imparted by the weight W of the ramp portion 60. It should be appreciated that each spring assembly 102, 122 may include a dead space 126 at one end, both ends, or neither end. Further, preload in the upper and lower springs 104 may differ as required in order to provide a moment $M_F$ that more closely approximates the moment $M_W$.

Closeout Assembly

Figure 17:
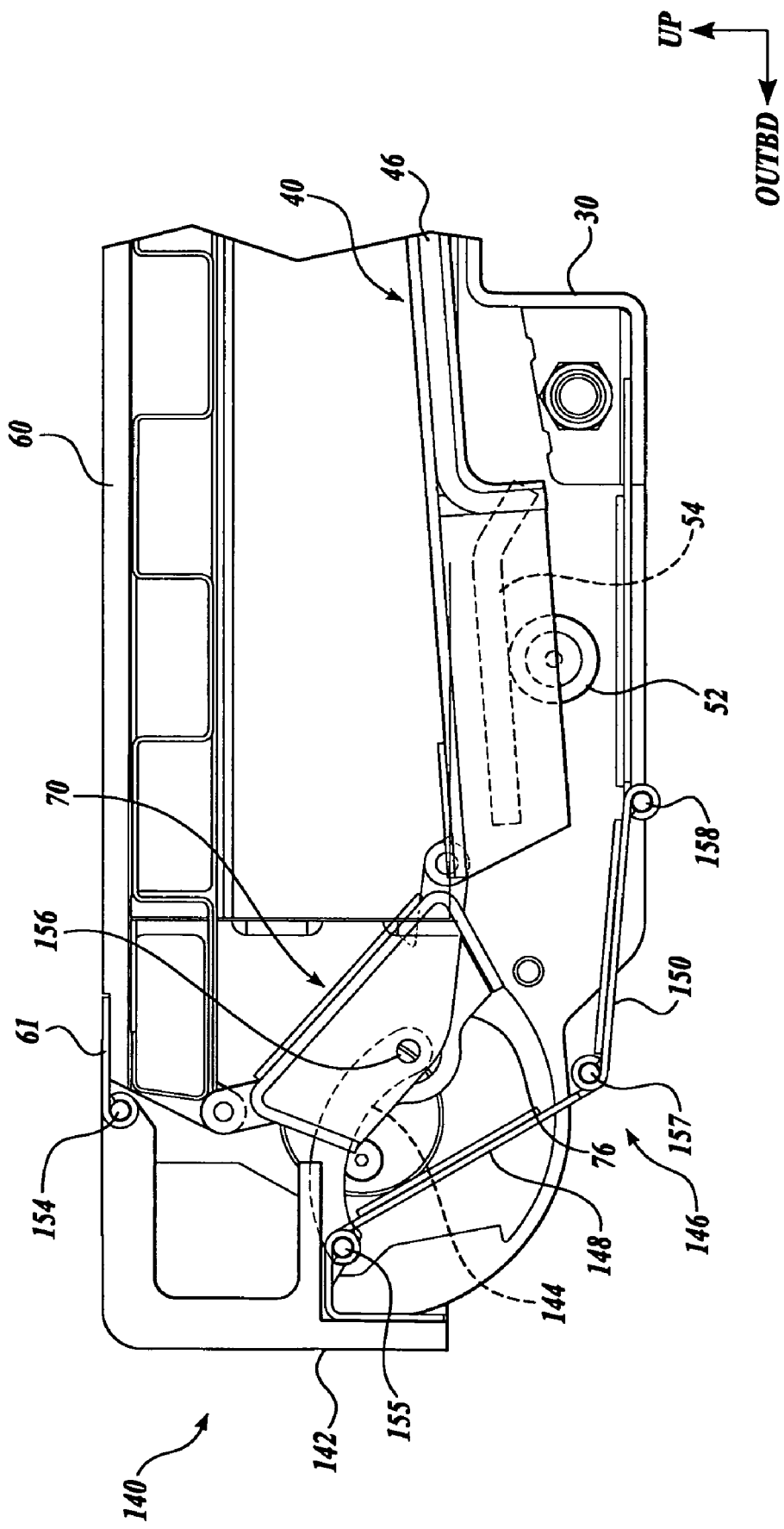
FIG. 17 is a partial cross-sectional view of a closeout assembly of the ramp assembly shown in FIG. 1, with the ramp portion in the stowed position.
Figure 18:
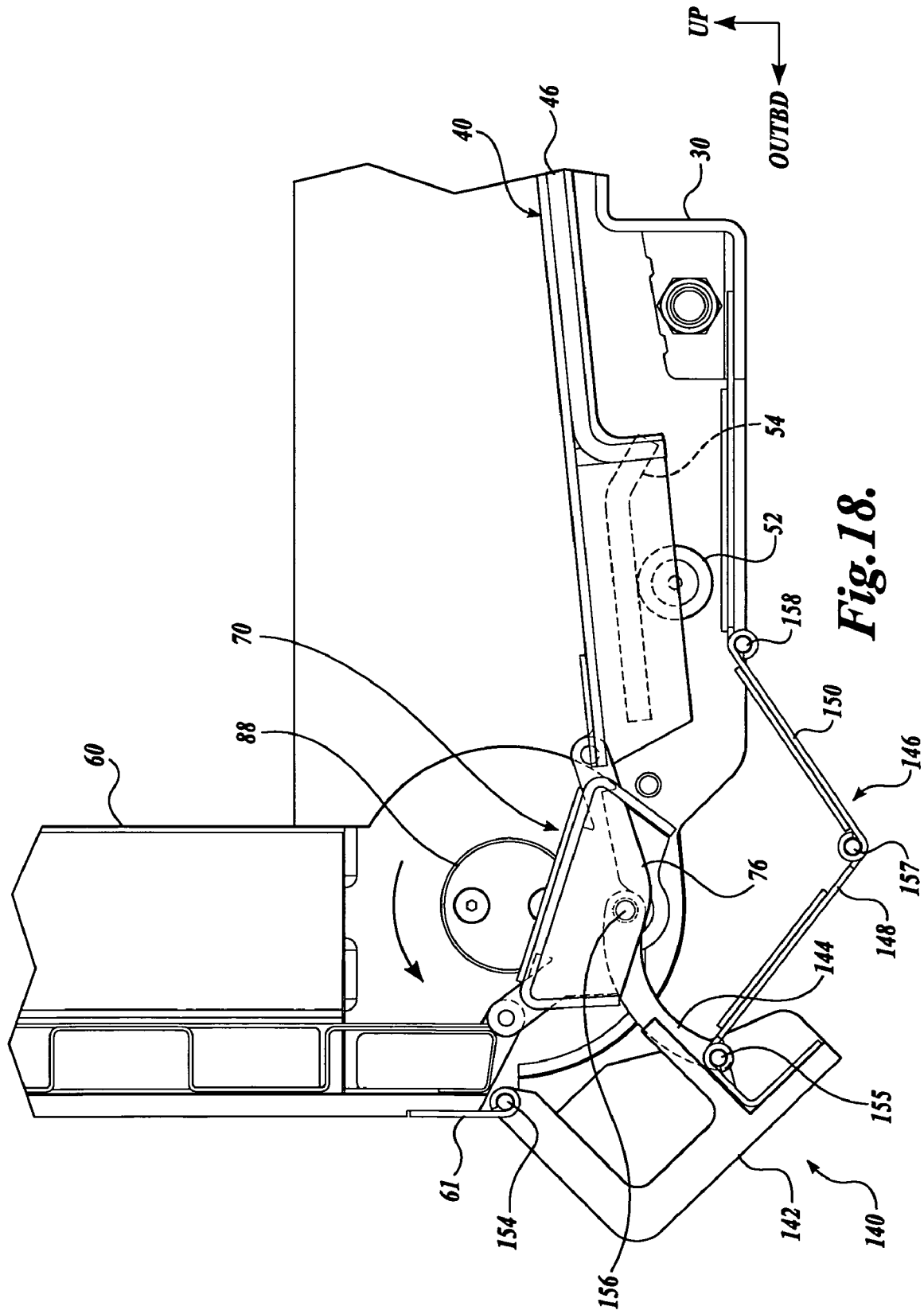
FIG. 18 is a partial cross-sectional view of the closeout assembly shown in FIG. 17, with the ramp portion positioned between the stowed position and a deployed position.
Figure 19:
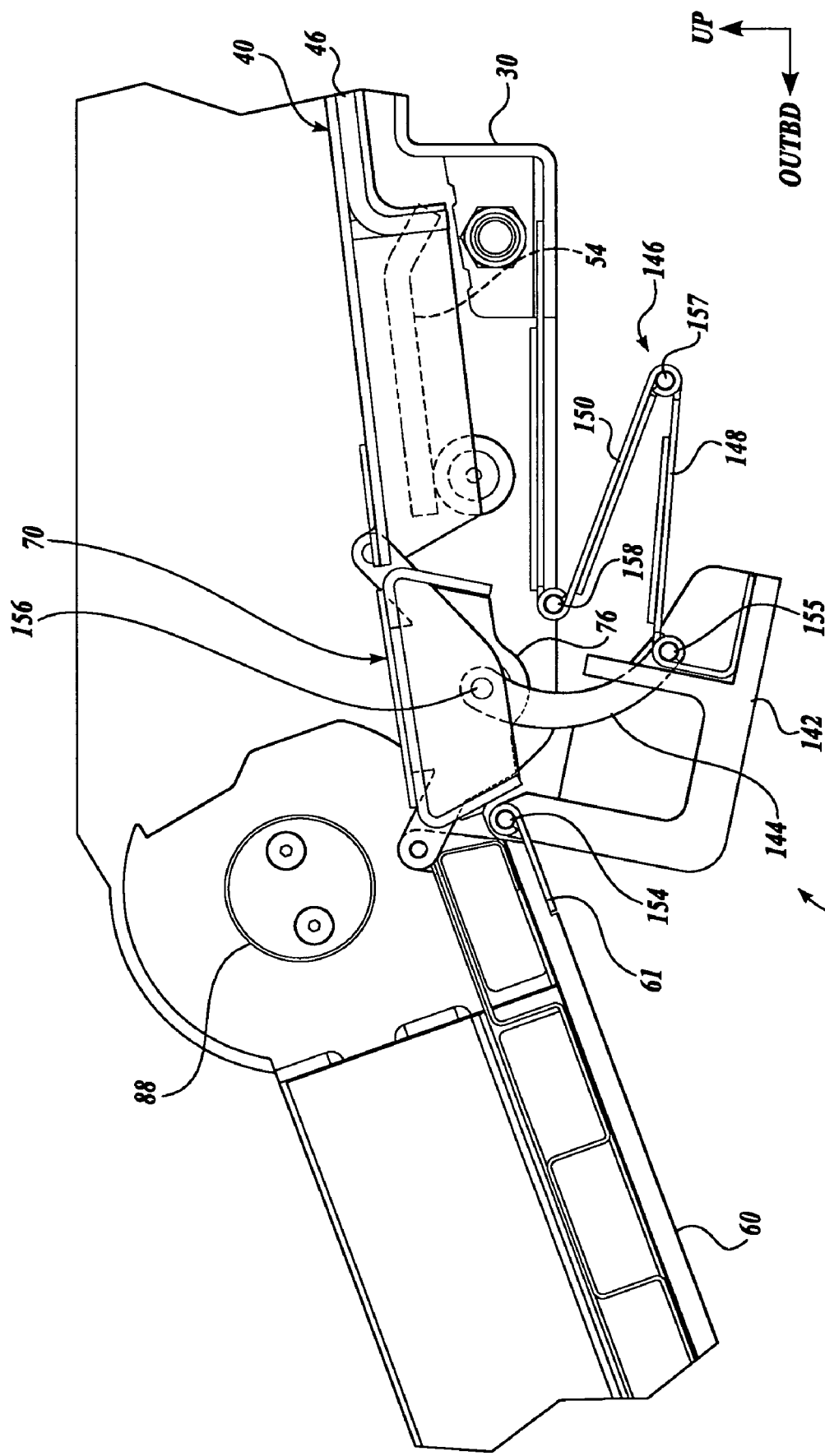
FIG. 19 is a partial cross-sectional view of the closeout assembly shown in FIG. 17, with the ramp portion in a deployed position.

Referring to FIGS. 17-19, the ramp assembly 20 is provided with a closeout assembly 140 located at the outboard end of the frame 30. The closeout assembly 140 limits access to the interior portion of the frame 30 at the outboard end, thereby reducing the amount of dirt and debris that can make its way into the interior portion of the frame 30. This decreases wear of the ramp assembly 20 components. The closeout assembly 140 also provides a step edge when the ramp portion 60 is in the stowed position, and people enter and exit the vehicle on foot.

The closeout assembly 140 includes an end cap 142 that extends in a forward and rear direction to cover at least partially the outboard end of the frame 30 when the ramp portion 60 is in the stowed position. The end cap 142 includes a horizontal, upward facing surface, which acts as a step edge, and a vertical, outboard facing surface. An upper end of the end cap 142 is hingedly connected to the first end 61 of the ramp portion 60 along a hinge axis 154 that is approximately parallel to the axis of rotation of the outboard sprocket 88 when the ramp portion 60 is in the stowed position. The closeout assembly 140 further includes a link 144 that is pivotally coupled at one end to a lower end of the end cap 142 along a hinge axis 155. The other end of the link 144 is pivotally coupled to the side support 76 of the intermediate panel assembly 70 along a hinge axis 156.

Referring to FIG. 17, a hinged panel assembly 146 spans a space between the end cap 142 and the lower portion of the outboard end of the frame 30. The hinged panel assembly 146 includes a first panel 148 hingedly coupled at a first end to a bottom portion of the end cap 142 along hinge axis 155. A second panel 150 is hingedly coupled at a first end to a second end of the first panel 148 along hinge axis 157. A second end of the second panel 150 is hingedly coupled to a lower portion of the outboard end of the frame along hinge axis 158. The hinge axes 154, 155, 156, 157, and 158 are approximately parallel to the axis of rotation of the outboard sprocket 88. Further, although the illustrated embodiment shows the link 144 connected to the end cap fitting 142 along hinge axis 155, it should be appreciated that the hinged connection between the link 144 and the end cap fitting 142 need not have a hinge axis coincident to hinge axis 155, but can instead have a hinge axis that is offset from hinge axis 155.

As the ramp portion 60 moves from the stowed position (FIG. 17), in which the closeout assembly 140 is in a closed position, through the neutral position (FIG. 18) to a deployed position (FIG. 19), in which the closeout assembly 140 is in an open position, the upper end of the end cap 142 moves in an arcuate path around the centerline of the outboard sprocket 88. The motion of the ramp portion 60 also drives the lower end of the end cap 142 via the link 144 so that the end cap 144 moves around the axis of the outboard sprocket 88 and out of the path of the ramp portion 60 to a position generally below the intermediate panel assembly 70. At the same time, the hinge axis 157 between the first panel 148 and the second panel 150 travels along an arcuate path to a position under the frame 30. As a result, as shown in FIGS. 17-19, the hinged panel assembly 146 folds about the hinge axis 157 between the first panel 148 and second panel 150, while moving out of the path of the end cap 142 to a position below the frame 30.

Latch Assembly

Referring to FIGS. 20-24, a latch assembly 160 is located at the inboard end of the ramp assembly 20. The latch assembly 160 engages the ramp portion 60 when the ramp assembly 20 is in the stowed position to secure the ramp relative to the frame 30. In the described embodiment, the latch assembly 160 also includes features to assist an operator with manual deployment of the ramp assembly 20.

Figure 21:
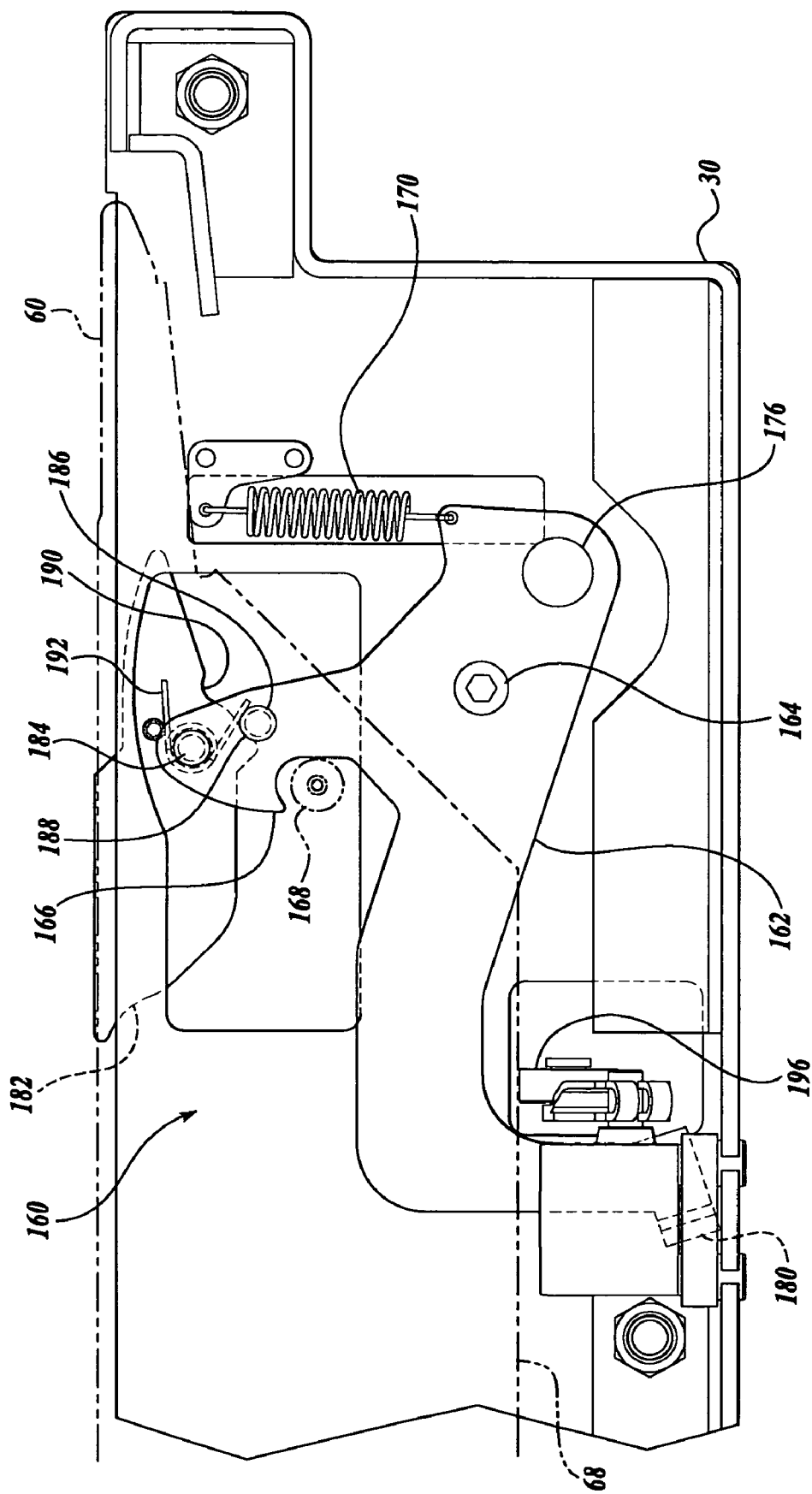
FIG. 21 is a partial cross-sectional view of a latch assembly of the ramp assembly shown in FIG. 20, with the ramp portion in the stowed position.

As shown in FIG. 21, the latch assembly 160 includes a latch fitting 162 pivotally coupled to the frame 30 with a pivot pin 164. In the illustrated embodiment, the latch fitting 162 and pivot pin 164 are positioned so that the latch fitting 162 is rotatable about an axis extending in the forward and rear directions, however other orientations are possible and should be considered within the scope of the disclosure.

The latch fitting 162 includes a hook portion 166. When the ramp portion 60 is in the stowed position, the hook portion 166 engages a latch pin 168, which extends from the ramp portion 60. In this first position (latched position), engagement of the hook portion 166 with the latch pin 168 maintains the ramp portion 60 in the stowed position. A spring 170 is connected at one end to the latch fitting 162 and at the other end to the frame 30. When the latch fitting 162 rotates to disengage the hook portion 166 from the latch pin 168, the spring 170 is extended. As a result, the spring 170 provides a force that tends to rotate the latch fitting 162 back toward the position in which the hook portion 166 engages the latch pin 168.

Figure 20:
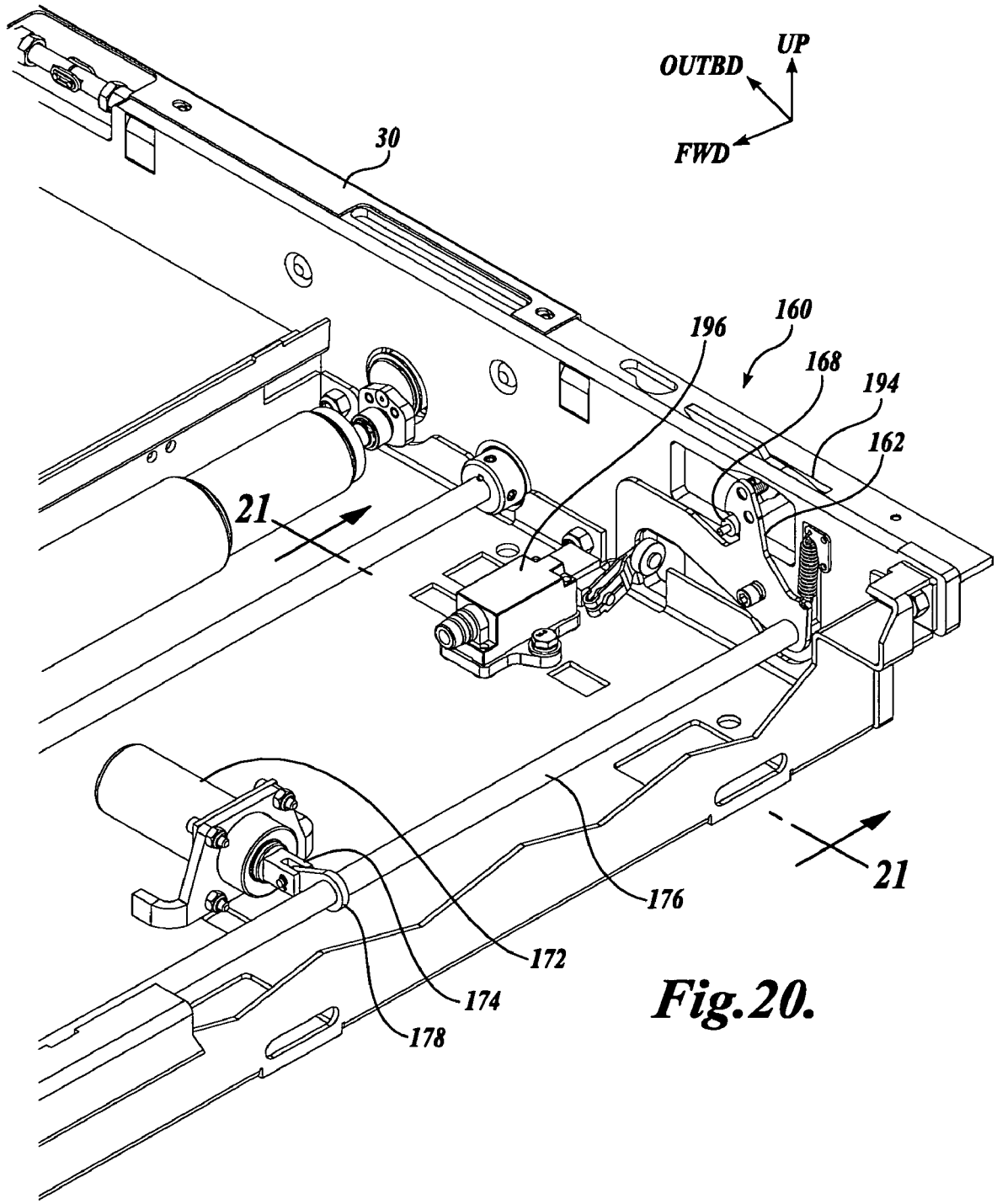
FIG. 20 is an isometric, partial cut-away view of the ramp assembly shown in FIG. 1, with the ramp assembly in a position between the stowed position and a deployed position.

Referring to FIG. 20, the latch assembly 160 is selectively operated by an actuator 172. In the illustrated embodiment, the actuator 172 is a solenoid disposed within the frame 30. The actuator 172 has an output shaft 174 coupled to a push bar 176 with an actuation bar fitting 178. The push bar 176 is also coupled to the latch fitting 162. When the actuator 172 is actuated, the output shaft 174 of the actuator 172 retracts, moving the push bar 176 in an outboard direction. The motion of the push bar rotates the latch fitting 162 to a second position (unlatched position), shown in FIG. 22, wherein the hook portion is disengaged from the latch pin 168. With the hook portion 166 disengaged from the latch pin 168, the ramp portion 60 is free to move away from the stowed position.

A tang 180 extends from the latch fitting 162 so that the tang 180 is positioned below a side curb 68 of the ramp portion 60. When the latch fitting 162 rotates to a third position (lifting position) shown in FIG. 24, the tang 180 travels upward in an arcuate path toward the side curb 68. The tang 180 contacts the side curb 68, and continues to travel along the arcuate path, thereby imparting a lifting force on the ramp portion 60.

Referring back to FIG. 21, a latch handle 182 is rotatably coupled to the latch fitting 162 with a pivot pin 184. Rotation of the latch handle 182 relative to the latch fitting 162 is limited by a retainer pin 186 that is attached to the latch fitting 162. The latch handle 182 is rotatable in a first direction relative to the latch fitting 162 until the retainer pin 186 engages a first recess 188 in the latch handle 182, thereby defining a retracted position. Engagement of the retainer pin 186 with the first recess 188 prevents further rotation of the latch handle 182 in the first direction relative to the latch fitting 162. Similarly, the latch handle 182 is rotatable in a second direction relative to the latch fitting 162 until the retainer pin 186 engages a second recess 190 in the latch handle 182, thereby defining an extended position. A torsion spring 192 is configured to act as a biasing member, applying a biasing force that tends to position the latch handle 182 in the retracted position.

In the illustrated embodiment, the latch handle 182 is disposed within a slot 194 so that the upper surface of the latch handle 182 is substantially parallel with the exposed upper surface of the ramp assembly 20. Sufficient space is provided to enable an operator to rotate the latch handle 182 by lifting up on the outboard edge of the latch handle 182.

The latch assembly 160 further includes a sensor 196 for sensing the position of the ramp portion 60. In the illustrated embodiment, the sensor 196 is a limit switch; however, it should be appreciated that various other sensors, such as proximity sensors, inclinometers, or any other suitable sensor for detecting ramp position may be used. When the ramp portion 60 is in the stowed position, the side curb 68 or some other feature of the ramp portion 60 engages limit switch 196. As the ramp portion 60 moves from the stowed position toward a deployed position, the ramp portion 60 disengages the limit switch 196. Disengagement of the limit switch 196 interrupts the supply of power to the actuator 172. With power to the actuator 172 interrupted, the spring 170 rotates the latch fitting 162 back to the position that the latch fitting 162 occupies when the latch fitting 162 engages the latch pin 168. Disengagement of the limit switch 196 also activates the vehicle interlock system. As a result, the vehicle is prevented from moving unless the ramp portion 60 is in the stowed position.

Figure 22:
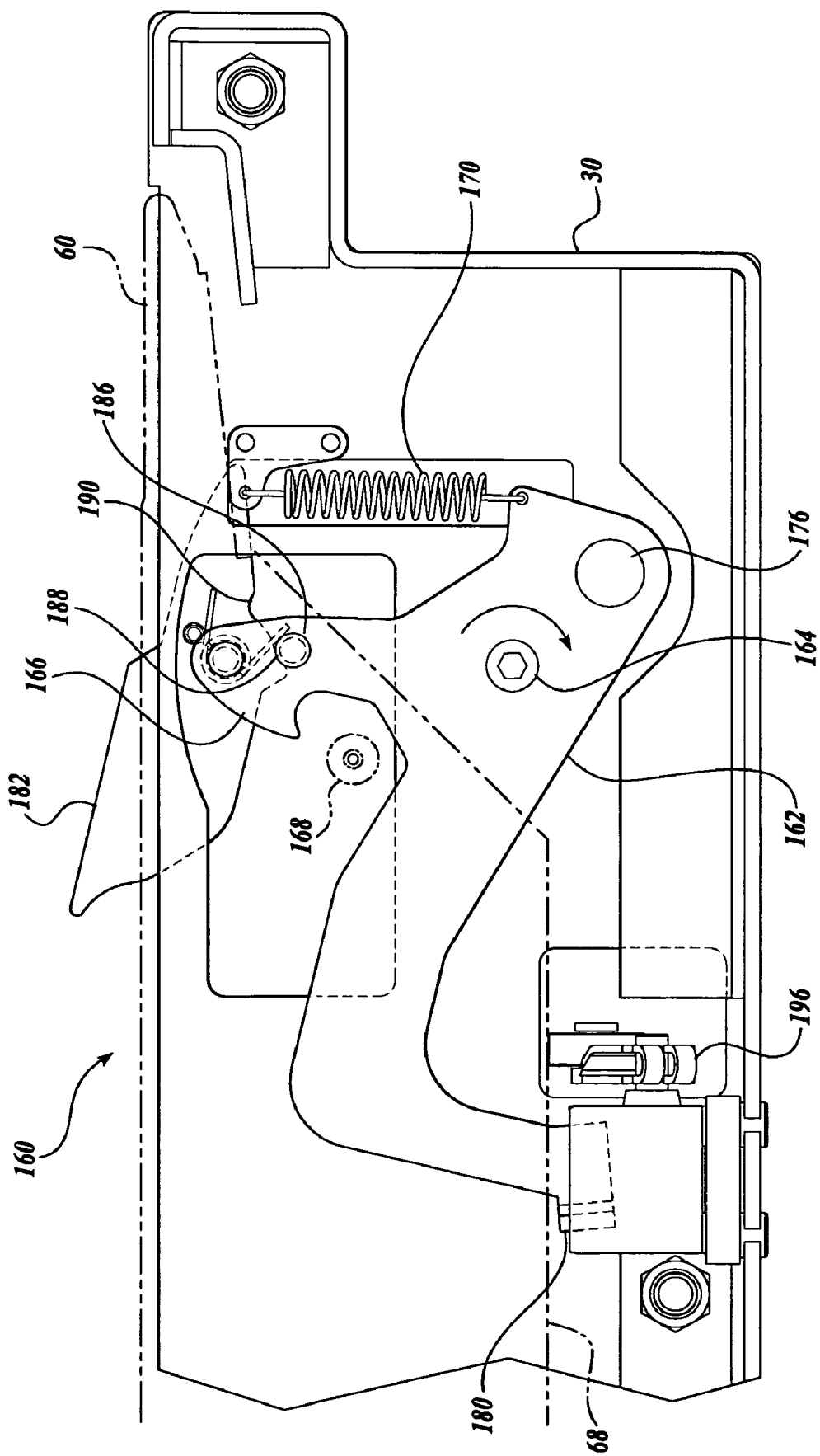
FIG. 22 is a partial cross-sectional view of the latch assembly of FIG. 21 during a powered unlatch operation.

FIG. 22 shows the latch assembly 160 in the unlatched position during a powered unlatch operation. During the powered unlatch operation, the actuator 172 actuates the push bar 176, which rotates the latch fitting 162 in a clockwise direction as viewed in FIG. 22. Rotation of the latch fitting 162 disengages the hook portion 166 from the latch pin 168. At the same time, the tang 180 contacts the side curb 68 of the ramp portion 60 to provide a lifting force that assists the drive assembly 80 in moving the ramp portion 60 from the stowed position. As the ramp portion moves away from the stowed position, the ramp portion 60 disengages the limit switch 196, thereby interrupting power to the actuator 172 and engaging the vehicle interlock system. With power to the actuator 172 interrupted, the latch fitting 162 returns to its original position due to the force provided by the spring 170.

When the ramp portion 60 returns to the stowed position, the latch pin 168 engages an upper surface of the hook portion 166 to rotate the latch fitting 162 out of the way of the latch pin 168. When the ramp portion 60 reaches the stowed position, the latch fitting 162 rotates back due to the force applied by the spring 170 so that the hook portion 166 engages the latch pin 168, thereby securing the ramp portion 60 in the stowed position.

Figure 23:
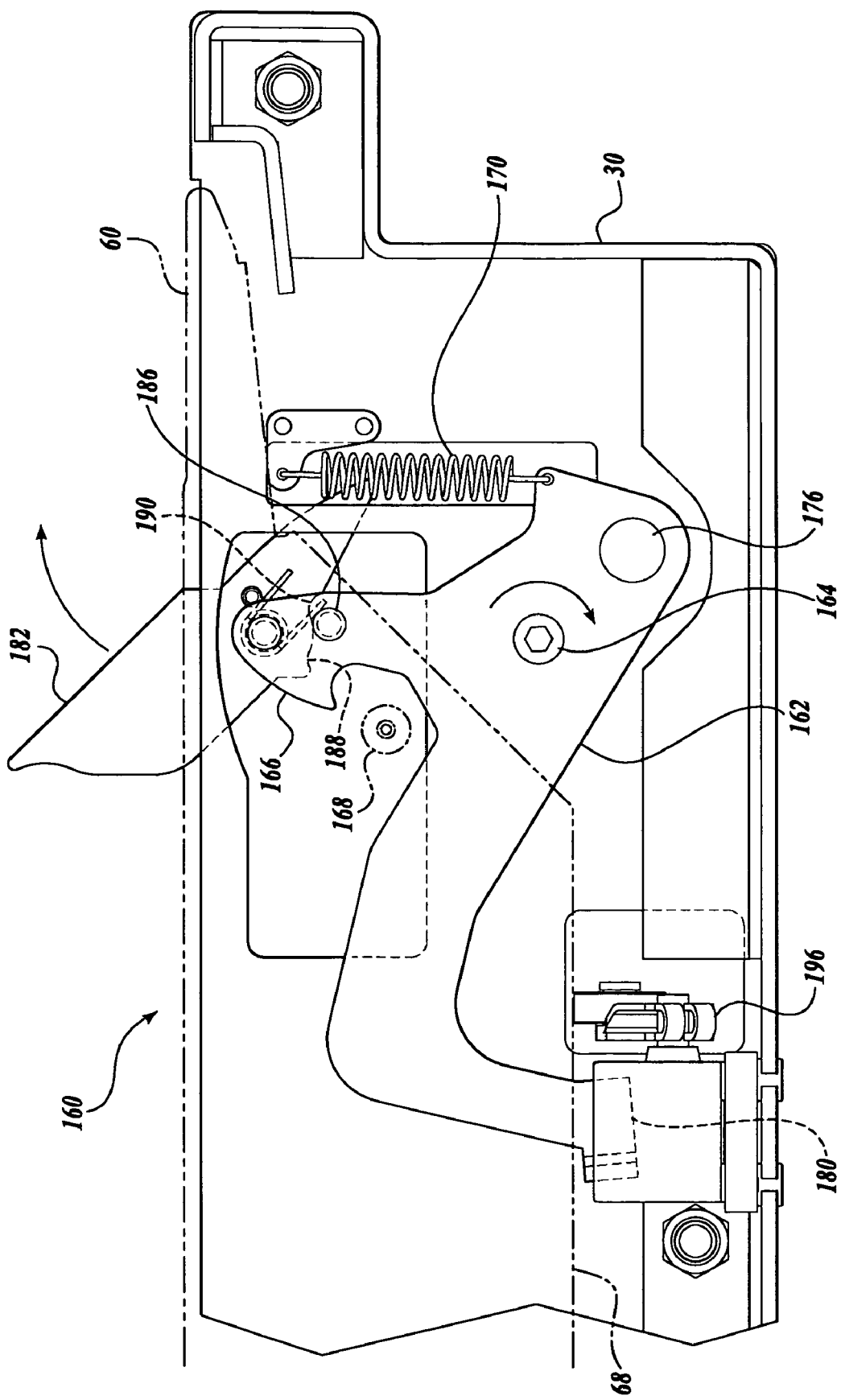
FIG. 23 is a partial cross-sectional view of the latch assembly of FIG. 21 during a first phase of a manual unlatch operation.
Figure 24:
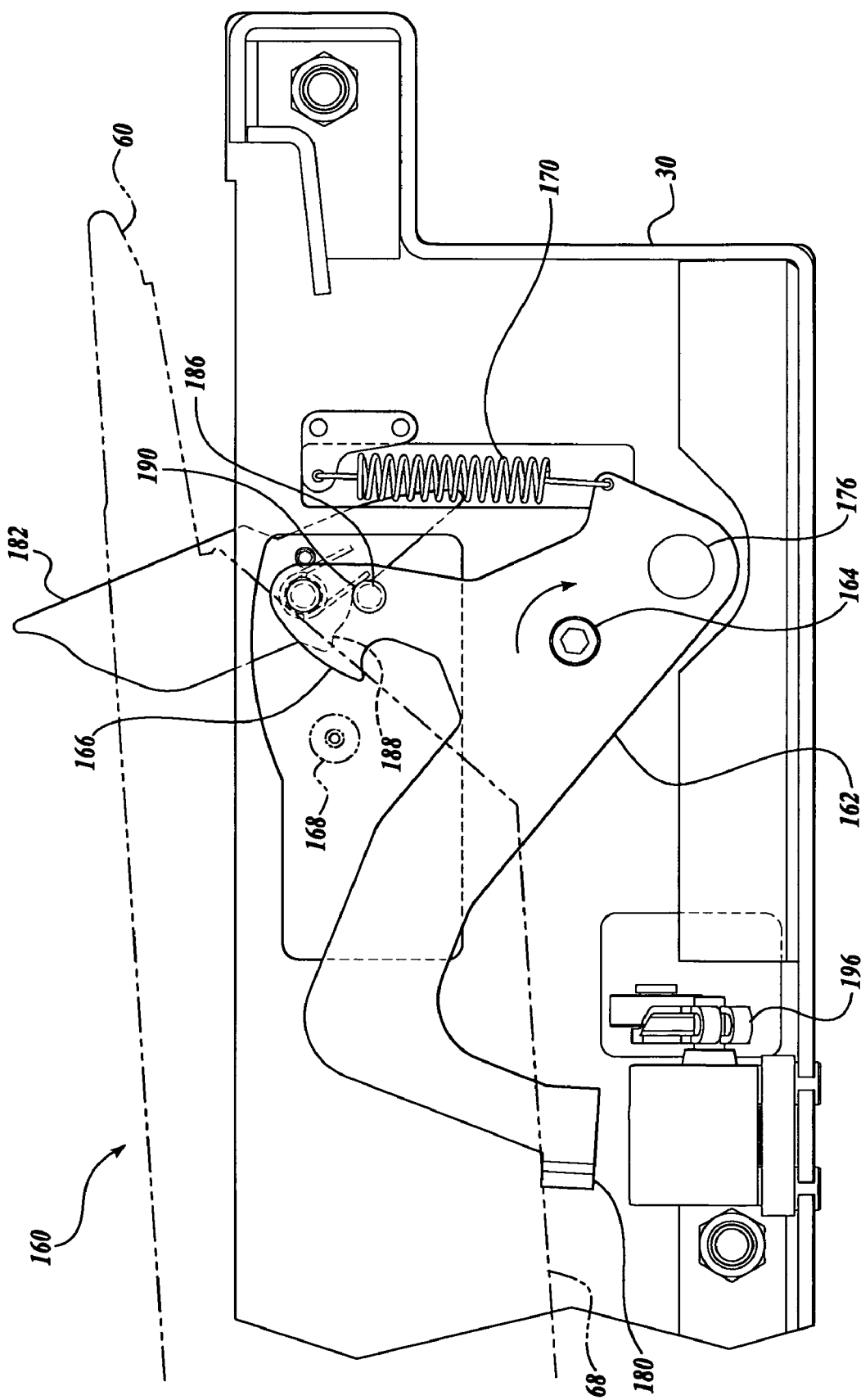
FIG. 24 is a partial cross-sectional view of the latch assembly of FIG. 21 during a second phase of a manual unlatch operation.

FIGS. 23 and 24 show the latch assembly 160 during a manual unlatch/lifting operation. An operator first pulls upwardly on an outboard end of the latch handle 182 to rotate the latch fitting 162 into the unlatched position shown in FIG. 23. Pulling on the latch handle 182 rotates the latch handle 182 until the retainer pin 186 engages the second recess 190 in the latch handle 182. With the retainer pin 186 engaging the second recess 190, continuing to pull on the latch handle 182 rotates the latch fitting 162 until the latch fitting is in the unlatched position.

The operator continues to pull on the latch handle 182, thereby rotating the latch fitting 162 to the lifting position shown in FIG. 24. In the lifting position, the tang 180 has rotated in an upward direction to contact the ramp portion 60. As the latch fitting 162 moves to the lifting position, the tang 180 applies a lifting force to raise the ramp portion 60. When the latch fitting 162 reaches the lifting position, the ramp portion 60 is raised a sufficient distance to provide access for the operator to grasp the ramp portion 60 and manually rotate the ramp portion 60 to a deployed position.

In the illustrated embodiment, a latch fitting 162 is positioned at both the forward and rear sides of the frame 30. Both latch fittings 162 are actuated by a single actuator 172. It should be appreciated that alternate embodiments are possible wherein a single latch fitting 162 is located at a forward, rear, or intermediate portion of the frame 30. Alternately, multiple actuators 172 may be included so that each actuator 172 actuates a different latch fitting 162. Further, in embodiments having multiple latch fittings 162, one or more of the latch fittings 162 may not have a latch handle 182 coupled thereto. One of skill in the art will appreciate that other variations in the configuration and location of the latch assembly 160 components are possible without departing from the scope of the disclosed subject matter.

While illustrative embodiments have been illustrated and described, it will be appreciated that various changes can be made therein without departing from the spirit and scope of the invention.

The embodiments of the invention in which an exclusive property or privilege is claimed are defined as follows:

1. A counterbalance for a ramp assembly, the ramp assembly having a ramp portion operatively coupled for reciprocating motion between a stowed position and a deployed position, the counterbalance comprising:
   a) a chain assembly, comprising:
      (i) a chain portion operatively coupled to the ramp portion to move along a path in a first direction when the ramp portion moves toward the stowed position, and in a second direction when the ramp portion moves toward the deployed position; and
      (ii) a rod coupled to the chain portion; and
   (b) a spring assembly, comprising:
      (i) a spring;
      ii) a first spring fitting restraining a first end of the spring when the ramp portion is between a neutral position and the stowed position and moving the first end of the spring toward a second end of the spring when the ramp portion moves from the neutral position toward the deployed position; and
      (iii) a second spring fitting spaced from the first spring fitting, the second spring fitting restraining the second end of the spring when the ramp portion is between the neutral position and the deployed position and moving the second end of the spring toward the first end of the spring when the ramp portion moves from the neutral position toward the stowed position.

2. The counterbalance of claim 1, wherein each of the first and second spring fittings comprises a flanged bushing.

3. The counterbalance of claim 1, the spring assembly further comprising a first biasing element attached to one of a first and second end of the rod and associated with a first end stop, the first biasing element contacting the first spring fitting to move the first spring fitting away from the first end stop when the ramp portion moves from the neutral position toward the deployed position.

4. The counterbalance of claim 3, the spring assembly further comprising a second biasing element attached to the other of the first and second end of the rod and associated with a second end stop, the second biasing element contacting the second spring fitting to move the second spring fitting away from the second end stop when the ramp portion moves from the neutral position toward the stowed position.

5. The counterbalance of claim 4, wherein each of the first and second biasing elements comprises a cylindrical bushing.

6. The counterbalance of claim 1, wherein the chain assembly further comprises a second rod coupled to the chain portion, the counterbalance further comprising a second spring assembly, the second spring assembly comprising:
   (a) a second spring;
   (b) a third spring fitting restraining a first end of the second spring when the ramp portion is between the neutral position and the deployed position and moving the first end of the second spring toward a second end of the second spring when the ramp portion moves from the neutral position toward the stowed position; and
   (c) a fourth spring fitting spaced from the third spring fitting, the fourth spring fitting restraining the second end of the second spring when the ramp portion is between the neutral position and the stowed position and moving the second end of the second spring toward the first end of the second spring when the ramp portion moves from the neutral position toward the stowed position.

7. The counterbalance of claim 6, the second spring assembly further comprising a third biasing element attached to one of a first and second end of the second rod and associated with a third end stop, the third biasing element contacting the third spring fitting to move the third spring fitting away from the third end stop when the ramp portion moves from the neutral position toward the stowed position.

8. The counterbalance of claim 7, the second spring assembly further comprising a fourth biasing element attached to the other of the first and second end of the second rod and associated with a fourth end stop, the fourth biasing element contacting the fourth spring fitting to move the fourth spring fitting away from the fourth end stop when the ramp portion moves from the neutral position toward the deployed position.

9. A drive assembly for reciprocating a movable ramp portion of a ramp assembly between a stowed position and a deployed position, the drive system comprising:
   (a) a motor;
   (b) a drive shaft operably coupled to the motor and to the ramp portion so that rotation of the drive shaft in a first direction drives the ramp portion toward the stowed position, and rotation of the drive shaft in a second direction drives the ramp portion toward the deployed position;
   (c) a chain assembly, comprising:
      (i) a chain portion operatively coupled to the drive shaft to move along a path in a first direction when the ramp portion moves toward the stowed position, and in a second direction when the ramp portion moves toward the deployed position; and
      (ii) a rod coupled to the chain portion; and
   (d) a spring assembly, comprising:
      (i) a spring;
      (ii) a first spring fitting restraining a first end of the spring when the ramp portion is between a neutral position and the stowed position and moving the first end of the spring toward a second end of the spring when the ramp portion moves from the neutral position toward the deployed position; and
      (iii) a second spring fitting spaced from the first spring fitting, the second spring fitting restraining the second end of the spring when the ramp portion is between the neutral position and the deployed position and moving the second end of the spring toward the first end of the spring when the ramp portion moves from the neutral position toward the stowed position.

10. The drive assembly of claim 9, the spring assembly further comprising a first biasing element attached to one of a first and second end of the rod and associated with a first end stop, the first biasing element contacting the first spring fitting to move the first spring fitting away from the first end stop when the ramp portion moves from the neutral position toward the deployed position.

11. The drive assembly of claim 10, the spring assembly further comprising a second biasing element attached to the other of the first and second end of the rod and associated with a second end stop, the second biasing element contacting the second spring fitting to move the second spring fitting away from the second end stop when the ramp portion moves from the neutral position toward the stowed position.

12. The drive assembly of claim 9, wherein the chain assembly further comprises a second rod coupled to the chain portion, the counterbalance further comprising a second spring assembly, the second spring assembly comprising:
   (a) a second spring;
   (b) a third spring fitting restraining a first end of the second spring when the ramp portion is between the neutral position and the deployed position and moving the first end of the second spring toward a second end of the second spring when the ramp portion moves from the neutral position toward the stowed position; and
   (c) a fourth spring fitting spaced from the third spring fitting, the fourth spring fitting restraining the second end of the second spring when the ramp portion is between the neutral position and the stowed position and moving the second end of the second spring toward the first end of the second spring when the ramp portion moves from the neutral position toward the stowed position.

13. The drive assembly of claim 12, the second spring assembly further comprising a third biasing element attached to one of a first and second end of the second rod and associated with a third end stop, the third biasing element contacting the third spring fitting to move the third spring fitting away from the third end stop when the ramp portion moves from the neutral position toward the stowed position.

14. The drive assembly of claim 13, the second spring assembly further comprising a fourth biasing element attached to the other of the first and second end of the second rod and associated with a fourth end stop, the fourth biasing element contacting the fourth spring fitting to move the fourth spring fitting away from the fourth end stop when the ramp portion moves from the neutral position toward the deployed position.

15. A ramp assembly, comprising:
   (a) a ramp portion operatively coupled to the vehicle for reciprocating motion between a stowed position and a deployed position;
   (b) a chain assembly, comprising:
      (i) a chain portion operatively coupled to the ramp portion to move along a path in a first direction when the ramp portion moves toward the stowed position, and in a second direction when the ramp portion moves toward the deployed position; and
      (ii) a rod coupled to the chain portion; and
   (c) a spring assembly, comprising:
      (i) a spring;
      (ii) a first spring fitting restraining a first end of the spring when the ramp portion is between a neutral position and the stowed position and moving the first end of the spring toward a second end of the spring when the ramp portion moves from the neutral position toward the deployed position; and (iii) a second spring fitting spaced from the first spring fitting, the second spring fitting restraining the second end of the spring when the ramp portion is between the neutral position and the deployed position and moving the second end of the spring toward the first end of the spring when the ramp portion moves from the neutral position toward the stowed position.

16. The ramp assembly of claim 15, the spring assembly further comprising a first biasing element attached to one of a first and second end of the rod and associated with a first end stop, the first biasing element contacting the first spring fitting to move the first spring fitting away from the first end stop when the ramp portion moves from the neutral position toward the deployed position.

17. The ramp assembly of claim 16, the spring assembly further comprising a second biasing element attached to the other of the first and second end of the rod and associated with a second end stop, the second biasing element contacting the second spring fitting to move the second spring fitting away from the second end stop when the ramp portion moves from the neutral position toward the stowed position.

18. The ramp assembly of claim 15, wherein the chain assembly further comprises a second rod coupled to the chain portion, the counterbalance further comprising a second spring assembly, the second spring assembly comprising:

(a) a second spring;

(b) a third spring fitting restraining a first end of the second spring when the ramp portion is between the neutral position and the deployed position and moving the first end of the second spring toward a second end of the second spring when the ramp portion moves from the neutral position toward the stowed position; and (c) a fourth spring fitting spaced from the third spring fitting, the fourth spring fitting restraining the second end of the second spring when the ramp portion is between the neutral position and the stowed position and moving the second end of the second spring toward the first end of the second spring when the ramp portion moves from the neutral position toward the stowed position.

19. The ramp assembly of claim 18, the second spring assembly further comprising a third biasing element attached to one of a first and second end of the second rod and associated with a third end stop, the third biasing element contacting the third spring fitting to move the third spring fitting away from the third end stop when the ramp portion moves from the neutral position toward the stowed position.

20. The ramp assembly of claim 19, the second spring assembly further comprising a fourth biasing element attached to the other of the first and second end of the second rod and associated with a fourth end stop, the fourth biasing element contacting the fourth spring fitting to move the fourth spring fitting away from the fourth end stop when the ramp portion moves from the neutral position toward the deployed position.

* * * * *

UNITED STATES PATENT AND TRADEMARK OFFICE
CERTIFICATE OF CORRECTION

PATENT NO. : 7,681,272 B2 Page 1 of 1
APPLICATION NO. : 12/114647
DATED : March 23, 2010
INVENTOR(S) : D. Morris et al.

It is certified that error appears in the above-identified patent and that said Letters Patent is hereby corrected as shown below:

On the Title Pg
Item (73)   Assignee   "Lift-U, division of Hogan Mfg.," should read
--Lift-U, Division of Hogan Mfg.,--

Col. 20   Line 34   "the stowed position" should read
(Claim 12)   --the deployed position--

Signed and Sealed this

Twenty-fifth Day of May, 2010

David J. Kappos
*Director of the United States Patent and Trademark Office*

(12) EX PARTE REEXAMINATION CERTIFICATE (8188th)
United States Patent
Morris et al.

(10) Number: US 7,681,272 C1
(45) Certificate Issued: Apr. 26, 2011

(54) COUNTERBALANCE ASSEMBLY FOR A FOLD OUT RAMP

(75) Inventors: Donald Morris, Conifer, CO (US); David Johnson, Modesto, CA (US)

(73) Assignee: Lift-U, division of Hogan Mfg., Inc., Escalon, CA (US)

Reexamination Request:
No. 90/011,040, Jun. 14, 2010

Reexamination Certificate for:
Patent No.: 7,681,272
Issued: Mar. 23, 2010
Appl. No.: 12/114,647
Filed: May 2, 2008

Certificate of Correction issued May 25, 2010.

Related U.S. Application Data

(60) Provisional application No. 60/916,238, filed on May 4, 2007, and provisional application No. 60/944,413, filed on Jun. 15, 2007.

(51) Int. Cl.
*E01D 1/00* (2006.01)

(52) U.S. Cl. .................. 14/71.3; 414/921; 74/89.2
(58) Field of Classification Search .................. None
See application file for complete search history.

(56) References Cited

U.S. PATENT DOCUMENTS 4,756,204 A 7/1988 Wittwer

*Primary Examiner*—Joseph A. Kaufman

(57) ABSTRACT

A counterbalance for a ramp assembly includes a chain assembly and a spring assembly. The spring assembly includes a spring and first and second spring fittings. The first spring fitting restrains a first end of the spring when the ramp portion is between a neutral position and the stowed position and moves the first end of the spring toward a second end of the spring when the ramp portion moves from the neutral position toward the deployed position. The second spring fitting is spaced from the first spring fitting and restrains the second end of the spring when the ramp portion is between the neutral position and the deployed position. The second spring fitting moves the second end of the spring toward the first end of the spring when the ramp portion moves from the neutral position toward the stowed position.

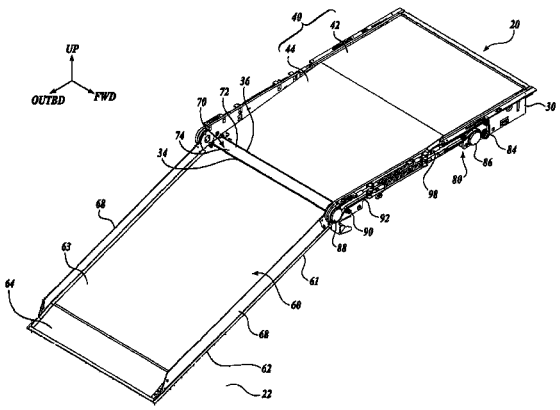

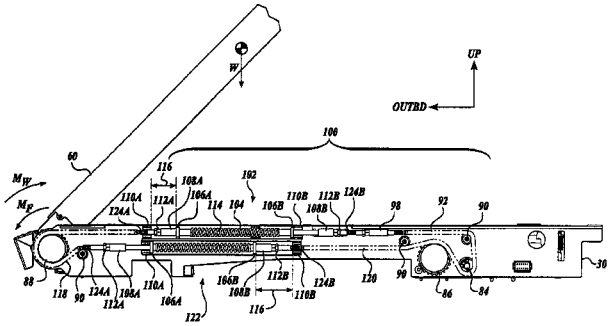

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *